(12) United States Patent
Khalid et al.

(10) Patent No.: US 12,461,031 B2
(45) Date of Patent: Nov. 4, 2025

(54) PATHOGEN DETECTION USING APTAMER MOLECULAR PHOTONIC BEACONS

(71) Applicant: 4233999 CANADA INC., Westmount (CA)

(72) Inventors: Najeeb Ashraf Khalid, Westmount (CA); Naqeeb Khalid, Brampton (CA)

( * ) Notice: Subject to any disclaimer, the term of this patent is extended or adjusted under 35 U.S.C. 154(b) by 100 days.

(21) Appl. No.: 18/068,008

(22) Filed: Dec. 19, 2022

(65) Prior Publication Data

US 2023/0184679 A1 Jun. 15, 2023

Related U.S. Application Data

(63) Continuation of application No. PCT/CA2021/050869, filed on Jun. 24, 2021, which is a continuation-in-part of application No. 17/182,130, filed on Feb. 22, 2021, now Pat. No. 11,053,556, which is a continuation of application No. 17/026,138, filed on Sep. 18, 2020, now Pat. No. 10,927,404.

(60) Provisional application No. 63/152,308, filed on Feb. 22, 2021, provisional application No. 63/044,602, filed on Jun. 26, 2020.

(51) Int. Cl.
| | |
|---|---|
| *G01N 21/64* | (2006.01) |
| *B01L 3/00* | (2006.01) |
| *C12N 15/115* | (2010.01) |
| *G01N 33/569* | (2006.01) |

(52) U.S. Cl.
CPC ....... *G01N 21/6428* (2013.01); *C12N 15/115* (2013.01); *G01N 21/645* (2013.01); *G01N 2021/6432* (2013.01); *G01N 2021/6439* (2013.01)

(58) Field of Classification Search
None
See application file for complete search history.

(56) References Cited

U.S. PATENT DOCUMENTS

| | | | |
|---|---|---|---|
| 5,350,564 A | 9/1994 | Mazza et al. | |
| 5,891,327 A | 4/1999 | Taunk | |

(Continued)

FOREIGN PATENT DOCUMENTS

| | | | |
|---|---|---|---|
| FR | 2395780 A1 | 1/1979 | |
| JP | 2013227034 A | 11/2013 | |

(Continued)

OTHER PUBLICATIONS

Tyagi et al. (Molecular Beacons: Probes that Fluoresce upon Hybridization; 1996 Nature) (Year: 1996).*

(Continued)

*Primary Examiner* — Neil N Turk
(74) *Attorney, Agent, or Firm* — Anglehart et al.

(57) ABSTRACT

This disclosure pertains to a testing method for a target pathogen. The method uses biosensors with particular fluorescence characteristics, such that when the biosensor binds to a target pathogen, a fluorophore may emit light if excited. The biosensor may be an aptamer-based biosensor with a fluorophore reporter and a quencher. The excitation of the fluorophore and the detection of fluorescence may be made through the use of a flashlight source and a camera from a mobile device, such as a smartphone.

9 Claims, 10 Drawing Sheets

(56) References Cited

U.S. PATENT DOCUMENTS

| | | | |
|---|---|---|---|
| 2003/0170613 A1* | 9/2003 | Straus | G01N 21/6428 435/5 |
| 2008/0121688 A1 | 5/2008 | Harrop | |
| 2010/0042072 A1 | 2/2010 | Hyde et al. | |
| 2010/0216175 A1 | 8/2010 | Melker et al. | |
| 2011/0009163 A1* | 1/2011 | Fletcher | G02B 21/16 455/556.1 |
| 2013/0157351 A1* | 6/2013 | Ozcan | G02B 7/006 422/69 |
| 2014/0120563 A1* | 5/2014 | Ozcan | G01N 21/78 435/7.94 |
| 2014/0206412 A1* | 7/2014 | DeJohn | B01L 7/52 455/556.1 |
| 2014/0296112 A1* | 10/2014 | O'Driscoll | G01N 21/645 250/206 |
| 2016/0124206 A1* | 5/2016 | Böse | G02B 21/26 435/287.1 |
| 2016/0231324 A1 | 8/2016 | Zhao et al. | |
| 2016/0274105 A1 | 9/2016 | Whitesides et al. | |
| 2017/0316487 A1 | 11/2017 | Mazed | |
| 2017/0370836 A1 | 12/2017 | Gerion et al. | |
| 2019/0079063 A1 | 3/2019 | Gilboa-Geffen et al. | |
| 2019/0240665 A1 | 8/2019 | Lionberger et al. | |
| 2020/0150120 A1 | 5/2020 | Willson et al. | |
| 2020/0283843 A1 | 9/2020 | Regev et al. | |
| 2021/0348243 A1* | 11/2021 | Ott | G01N 21/6456 |
| 2021/0373008 A1* | 12/2021 | Yaghoubi | G01N 33/54373 |
| 2023/0323487 A1* | 10/2023 | Green | C12Q 1/701 435/5 |

FOREIGN PATENT DOCUMENTS

| | | |
|---|---|---|
| WO | 01/54817 A2 | 8/2001 |
| WO | 2014/198836 A1 | 12/2014 |

OTHER PUBLICATIONS

Corresponding European application No. 21829019.5 examination report dated Dec. 8, 2023.
Corresponding European application No. 21829019.5 Communication about intention to grant a European patent dated Jun. 12, 2024.
Corresponding Canadian application No. 3,173,599 examination report dated Feb. 22, 2024.
International application No. PCT/CA2021/050869 International Preliminary Report on Patentability Chapter I dated Dec. 13, 2022.
International application No. PCT/CA2021/050869 International Search Report dated Oct. 20, 2021.
International application No. PCT/CA2021/050869 Supplementary International Search Report dated Oct. 4, 2022.
International application No. PCT/CA2021/050869 Supplementary Search Strategy dated Oct. 4, 2022.
International application No. PCT/CA2021/050869 Search Strategy dated Oct. 20, 2021.
International application No. PCT/CA2021/050869 Written Opinion of the International Searching Authority dated Oct. 20, 2021.
Yamamoto R et al: "Molecular beacon aptamer fluoresces in the presence of Tat protein of HIV-1", Genes to Cells, Wiley-Blackwell Publishing Ltd, GB, vol. 5, No. 5, May 1, 2000 (May 1, 2000), pp. 389-396, XP002224714.
Yu Hojoeng et al: "Smartphone fluorescence spectroscopy", Progress in Biomedical Optics and Imaging, SPIE—International Society for Optical Engineering, Bellingham, WA, US, vol. 9310, Mar. 2, 2014 (Mar. 2, 2014), pp. 931 00B-931 00B, XP060046136.
Moutsiopoulou Angeliki et al: "Molecular Aptamer Beacons and Their Applications in Sensing, Imaging, and Diagnostics", Small, vol. 15, No. 35, Jul. 17, 2019 (Jul. 17, 2019), p. 1902248, XP055885599.
Chinnappan Raja et al: "Fluorometric graphene oxide-based detection of *Salmonella enteritis* using a truncated DNA aptamer", Microchimica Acta, Springer Vienna, Vienna, vol. 185, No. 1, Dec. 18, 2017 (Dec. 18, 2017), pp. 1-9, XP036394205, ISSN: 0026-3672, DOI: 10.1007/S00604-017-2601-9.
John G Bruno et al: "Development of Aptamer Beacons for Rapid Presumptive Detection ofSpores", Journal of Fluorescence, Kluwer Academic Publishers-Plenum Publishers, NE, vol. 22, No. 3, Jan. 5, 2012 (Jan. 5, 2012), pp. 915-924, XP035052400.
Wang Li-Ju et al: "An ultra-low-cost smartphone octochannel spectrometer for mobile health diagnostics", Journal of Biophotonics, vol. 11, No. 8, Aug. 1, 2018 (Aug. 1, 2018), XP055961770.
Yi Wang et al: "Smartphone spectrometer for colorimetric biosensing", Analyst, vol. 141, No. 11, Jan. 1, 2016 (Jan. 1, 2016), pp. 3233-3238, XP055552539.
Ding Xiong et al: "Interfacing Pathogen Detection with Smartphones for Point-of-Care Applications", Analytical Chemistry, vol. 91, No. 1, Jan. 2, 2019 (Jan. 2, 2019), pp. 655-672, XP055961802.
Lee Nu Ree et al: "User-friendly point-of-care detection of influenza A (H1 N1) virus using light guide in three-dimensional photonic crystal", RSC Advan.
Xiaodan Zeng et al., Fluorescence detection of adenosine triphosphate through an aptamer-molecular beacon multiple probe, Analytical Biochemistry, vol. 424, Issue 1, May 1, 2012, pp. 8-11.
Corresponding European application No. 21829019.5 examination report dated Jun. 6, 2023.

\* cited by examiner

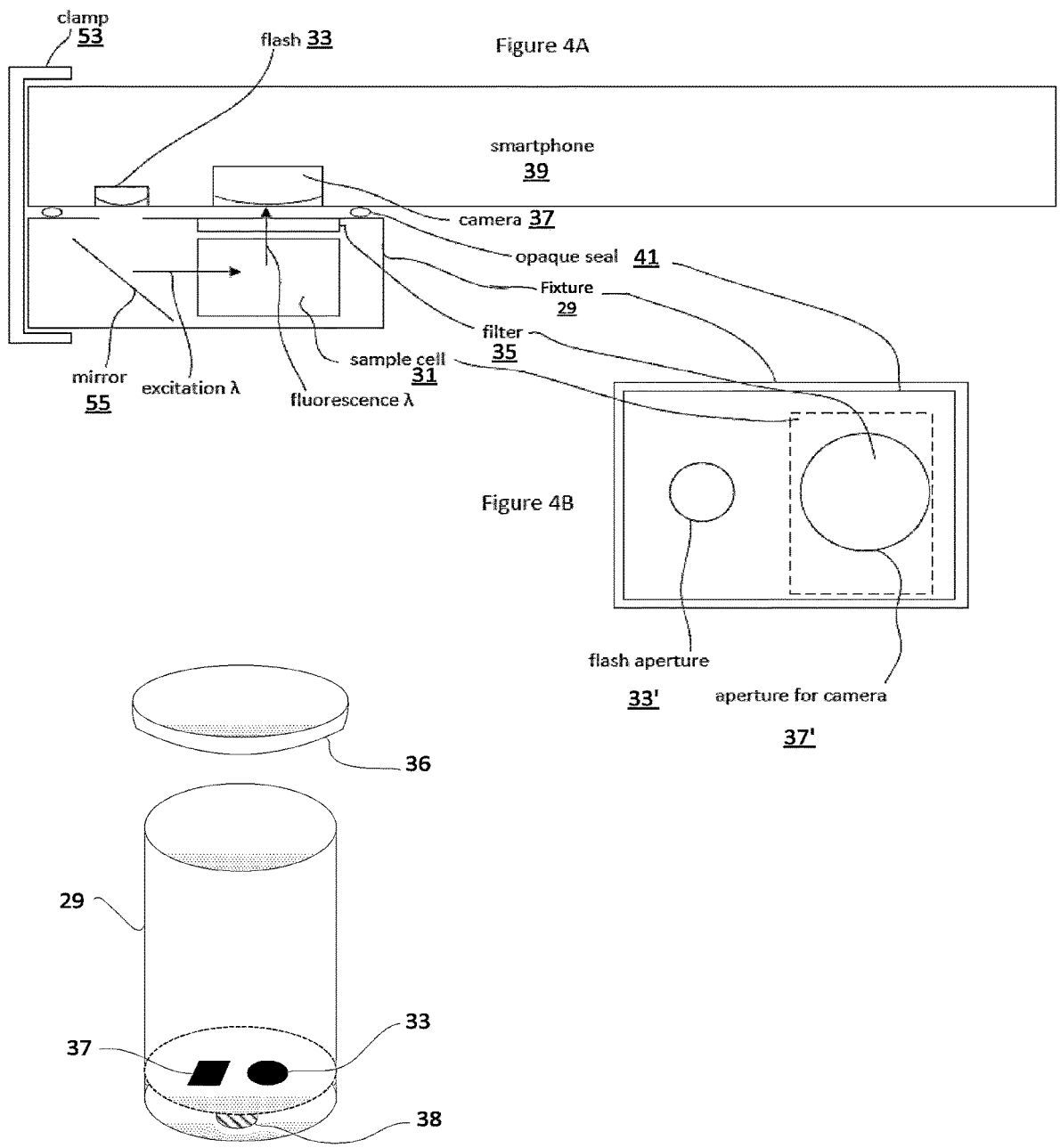

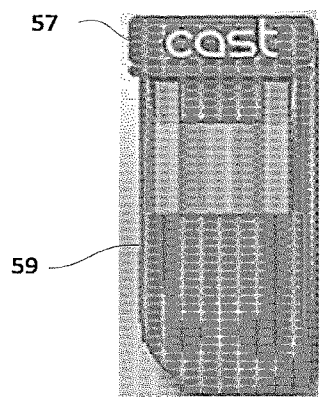
FIGURE 5A
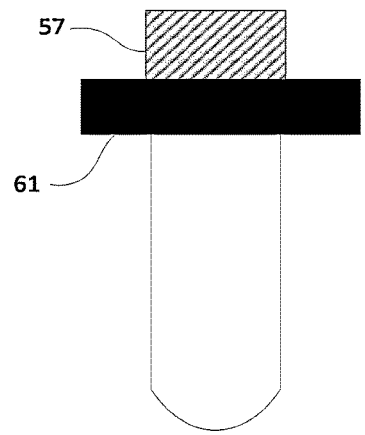
FIGURE 5B
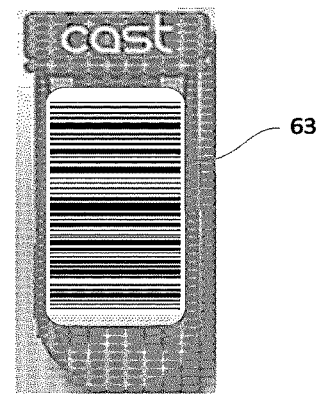
FIGURE 5C
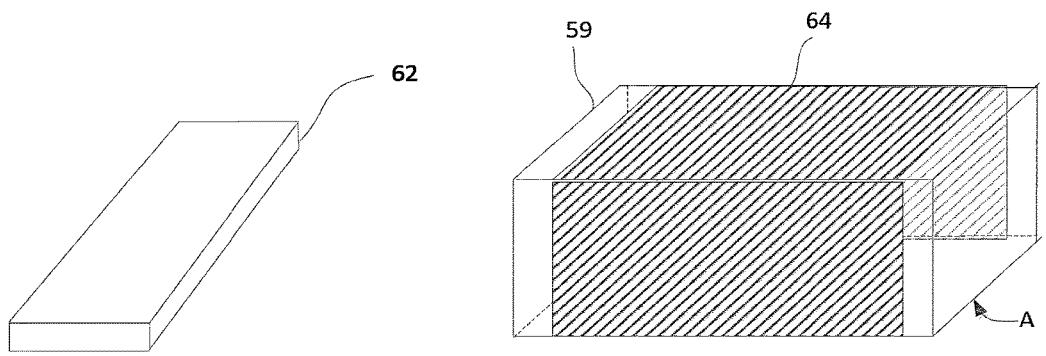
FIGURE 5D
FIGURE 5E

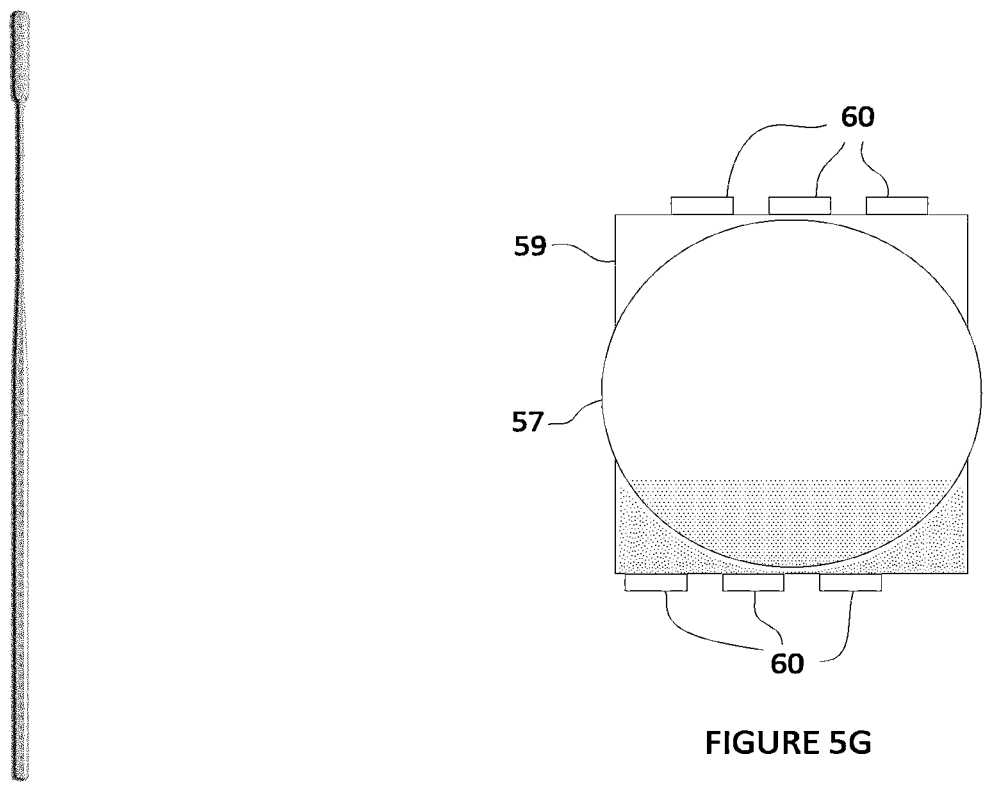
FIGURE 5G
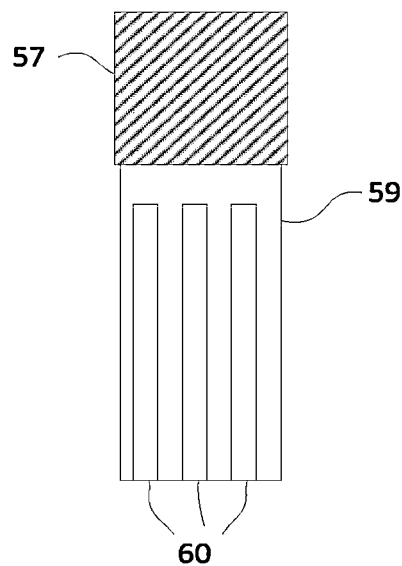
FIGURE 5F
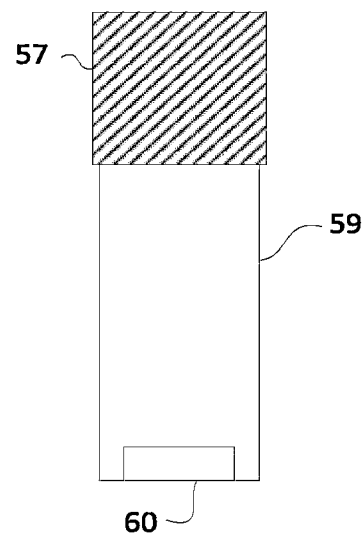
FIGURE 5H
FIGURE 5I

PATHOGEN DETECTION USING APTAMER MOLECULAR PHOTONIC BEACONS

This patent application claims priority to U.S. provisional patent application Ser. No. 63/044,602 filed Jun. 26, 2020, to U.S. provisional patent application Ser. No. 63/152,308 filed Feb. 22, 2021, and is a continuation-in-part of U.S. patent application Ser. No. 17/182,130 filed Feb. 22, 2021 and issued on Jul. 6, 2021 as U.S. Pat. No. 11,053,556 that is a continuation of U.S. patent application Ser. No. 17/026,138 filed Sep. 18, 2020 and issued on Feb. 23, 2021 as U.S. Pat. No. 10,927,404, the contents of which are hereby incorporated by reference.

TECHNICAL FIELD

The field of this invention is medical testing equipment for the detection of pathogens using aptamers, particularly by using Aptamer Molecular Photonic Beacons (AMPB).

BACKGROUND

Aptamers are oligonucleotide or peptide molecules that bind to a specific target molecule and that have been studied as early as 1990. Aptamer-based biosensors have been developed for use in a wide variety of sensing technique, such as electrochemical, optical and mass-sensitive analytical techniques. Aptamers exhibit many advantages as recognition elements in biosensing when compared to traditional antibodies. They are small, chemically stable and cost effective. More importantly, aptamers offer remarkable flexibility and convenience in the design of their structures, which has led to novel biosensors that have exhibited high sensitivity and selectivity.

Aptamers are well known to have distinctly different conformations and structures before and after binding with the targets. In fluorophore-based aptamers, the structural changes of aptamer may modify the structure such that a quencher-reporter structure (i.e. an aptamer molecular photonic beacon) may be separated, thus allowing the reporter to exhibit fluorescence when excited with a light source at a certain wavelength.

Aptamers may be developed and selected specifically for a target pathogen and therefore may be used in diagnostic tests for almost any infection. The fluorescence produced by an aptamer molecular fluorescence beacon is generally detected through fluorescence spectroscopy or fluorometry, which are costly equipment which are not necessarily portable. Additionally, the complexity of operations of such equipment is inherently high and require specific training. Therefore, aptamer-based testing is not accessible for most applications and may not be used in most facilities.

Since aptamers may be developed for a specific pathogen, its diagnostic testing capabilities are incredible, but the current limitations for analyzing the aptamer's response do not allow for its widespread use. As such, it would be beneficial to have an aptamer-based testing device which may be affordable, operable by almost anyone and with no highly specialized devices (other than the aptamer filled testing vial). A portable testing unit may further be desirable as it may allow testing anywhere.

Medical testing equipment often includes vials, whether it is to carry a test subject's sample (e.g. blood, saliva, etc.), a solution carrying molecules reacting to a substance being tested or any type of medication. Vials may be used by testing equipment, such as chromatographs, spectrographs, centrifuges, etc. Vials have existed since classical antiquity and have generally retained the same shapes and utility, although trading glass for plastics.

Medical testing vials typically have a cylindrical shape with clear walls, such as to be able to assess the presence and quantity of a substance inside the container. Vials may further have a flat-bottom surface, to rest vertically, or an arcuate bottom-shape to fit inside vial racks and certain testing equipment. As for the cap, vials normally feature either a twist cap, a hinged cap, or an inserted cap. Caps do not generally have any other special features.

In order to reduce the costs of producing specialized vials, the fit and form of such vials and caps are typically standardized and produced by companies supplying the pharmaceutical field. Therefore, the medical testing equipment analyzing the samples contained in such vials are generally designed to accommodate these standard vials. However, certain new testing devices may require specially shaped vials or certain specific characteristics of the vial and/or its cap for the testing device to function properly. For example, a testing device using optical properties may require a complete seal to ambient lighting inside its testing area. In order to produce viable results, the testing vial may be fully inserted in the device (i.e. the light seal is included with the testing device). That being said, such testing devices would necessarily be more voluminous (e.g. access panel, room for the complete vial inside the testing area plus additional spacing for securing/removing the vial in place, etc.) and may increase the chances of damaging the structure and sensors compared to a testing device in which the test vial is only inserted in an opening on the outside of the testing device.

To perform a viable test in such a testing device, it would be beneficial to have a means to properly seal the ambient light from the testing area inside the testing device while still allowing easy access to the medical test vial cap for insertion/removal from the testing device. It would further be beneficial if this light sealing capability was included directly on the test vial cap.

In addition to the specificities of the caps, the fit and form of the vials themselves are typically standardized and produced by companies supplying the pharmaceutical field. Therefore, the medical testing equipment analyzing the samples contained in such vials are generally designed to accommodate these standard vials. While medical testing equipment are mainly operated by specialized technicians and other medical personnel, the vials may not require any special features ensuring their correct use. As a matter of fact, users trained on how to perform a test using the medical testing equipment, including the vial, would have a low chance of misplacing or mispositioning the vials inside the medical testing equipment. However, certain testing devices may be used by untrained and otherwise medically unqualified users. For example, a testing device may be publicly available, with or without prescription, and may require the insertion of a vial inside the testing device to perform the test. Depending on the testing device, the test vial may require a specific orientation or position to produce results.

As such, it would be beneficial to have an affordable medical testing vial with certain design characteristics which would allow anyone to properly perform a test in a testing device, without any risk of voiding the test by a mispositioning, a misalignment or a misorientation of the vial. Additionally, in order to use a larger variety of light sensors, including less costly sensors which generally have less sensitivity, it would be beneficial for the vials to provide means to increase the number of photons triggering the desired effect in the tested sample and to redirect light towards the light sensor.

SUMMARY

Applicant has discovered a testing method for a target pathogen that may be used with a mobile device, such as a smartphone, instead of specialized devices. By selecting an Aptamer that binds uniquely to the virus that is the target for a test, and by attaching a selected appropriate fluorophore and matching quencher for the chosen aptamer, an Aptamer Molecular Photonic Beacon may be formed. This Aptamer Molecular Photonic Beacon displays the property that prior to binding to the specific virus, it has a shape where the quencher is in proximity to the fluorophore, and when it binds, the shape changes and the quencher molecule separates from the fluorophore. The fluorophore then, on receiving incident light will fluoresce at a different wavelength than the incident light. The aptamer, the fluorophore and the quencher can be specifically selected to have an excitation wavelength that approximately is the same as a smartphone LED's spectral peak and the emitted light can be within the range of sensitivity of the smartphone's camera sensors.

As a matter of fact, most mobile devices use the same type of LED flash technology which produces white light by using a blue GaN light-emitting diode (LED) (e.g. emitting with a peak at about 460 nm) with a layer of light-emitting phosphor to produce other wavelengths so that the combination of wavelengths appears to be white to the human eye. This white LED output contains a reasonably narrowband source of optical power in the blue part of the spectrum.

Applicant has discovered that selecting a fluorophore with specific properties, such that it is operable to be excited by the wavelengths produced by a mobile device LED flash light and produce an output light at a different wavelength, allowed the aptamer molecular photonic beacon to be used for testing with a mobile device. As a matter of fact, selecting a fluorophore excitable at around 460 nm opens the possibilities of use with the vast majority of the flash light sources from any type of mobile devices (e.g. smartphone, tablet, etc.). It will be understood that the use of such aptamer molecular photonic beacons is not limited to a flash light source from a mobile device. The fluorophore of the aptamer molecular photonic beacon may be selected from known fluorophores to be operable at any desired wavelength.

Applicant has further discovered that using a specifically designed testing vial may allow certain medical tests to be done by anyone, whether they have training in using the medical testing device or not. The testing vial may have reciprocating structures in the medical testing device in which it will be inserted. As such, the testing vial may have grooves on one or more side which may guide the vial to be inserted in a unique orientation inside the testing device. The grooves may be replaced by any structural part of the testing vial which, on one or more sides of the testing vial, may only the vial to be inserted in a desired way. For example, the testing vial container itself may be of a particular shape, such as a trapezoidal form, which only allows it to fit in one manner inside the receptacle of the testing device.

In some embodiments, the vial can be configured to provide one or more suitable apertures for the camera and for the flash to be pressed directly against the mobile computing device's surface, while the rest of the vial assures sufficient shrouding of ambient light and a suitable reflection or return of light originating from the flash, interacting with the aptamer molecular photonic beacons and captured by the camera. This can be achieved, for example, by applying suitable stickers to the exterior of the vial or by providing a suitable insert in the vial. In this way, an apparatus separate from the vial is not required for the mobile computing device to perform a test.

Applicant has further discovered that using a specifically designed testing vial cap with a light lock (i.e. a light sealing structure) may provide sufficient sealing of ambient light to perform an optically sensitive test inside an enclosure, without requiring the full insertion of the testing vial inside the enclosure. As such, the testing device may be smaller than a variant which would require the full insertion of the vial inside the enclosure. Additionally, the operation of the testing device is simplified by the usage of a device in which a user may only insert and remove a testing vial. This ensures that no internal part of the testing device (e.g. the sensor, filters, etc.) can be tampered with and/or damaged during the insertion and removal of the testing vial. This may be particularly relevant for new medical testing device available to the general public. As a matter of fact, when not operated by trained technicians or professionals, the devices need to be easily operated and prevent any tampering or potential damage which could impact the validity of the test results.

Applicant has discovered that using a specifically designed testing vial reflective label significantly improves certain optical testing which may be done on a tested sample in a vial. For example, the testing of a sample for the identification of the presence of a pathogen using fluorescence of an aptamer-based molecular beacon may be improved by the use of a test vial with a reflective label. As a matter of fact, when there is a limited number of bound aptamers (i.e. aptamers in which the fluorescent reporter molecule is separated from the quencher molecule), the fluorescence response to a light excitation may be sparse enough such that the light sensor may not necessarily receive enough photons to trigger the positive identification of the desired target pathogen.

By providing a reflective label at least on the back of the test vial (i.e. opposite side of the light source and light sensor), fluorescence emitted towards the opposite side of the light sensor may nevertheless reach the light sensor after being reflected. This ensures an increase in sensitivity for the test.

Additionally, the optical medical testing device may not require a reflective surface, such as a mirror, in the device itself. Being fixed to the surface of the vial further improves the reflective properties, as it is inherently protected against contamination. A reflective surface included in the testing device may require cleaning to ensure similar conditions.

Moreover, the reflective label may present all the information required by the health authorities on its outwards face. As such, the reflective label replaces the information label that is necessarily required on each testing vial and provides both the information and the reflective properties for a similar price. This further simplifies the design of the medical testing device without adding new parts or complexities in the manufacturing of the medical testing vial.

A first broad aspect is an aptamer molecular photonic beacon testing device for detecting a pathogen including: a receptacle for receiving a test vial; a coupler for receiving a mobile device having a camera and a flash light source, the coupler being positioned with respect to the receptacle to allow for light from the flash light source to reach the test vial and for fluorescence light from the test vial generated in response to the light from the flash light source to reach the camera; and a lightproof enclosure for preventing external ambient light from reaching the camera when the mobile device is coupled.

In some embodiments, the aptamer molecular photonic beacon testing device further includes a bandpass optical filter to allow the light from the flash light source to reach the Aptamer Molecular Photonic Beacon while allowing the fluorescence from the fluorophore bound to the aptamer to reach the camera.

In some embodiments, the mobile device and the test vial are completely enclosed in the lightproof enclosure.

In some embodiments, the coupler is a slot in the lightproof enclosure.

In some embodiments, the coupler includes an opaque seal.

In some embodiments, the lightproof enclosure further includes a movable gate to access the test vial receptacle, the movable gate being configured to prevent the ambient light from leaking inside the lightproof enclosure in a closed position.

In some embodiments, the coupler is one of a mobile device cover or an attachable mobile camera cover.

In some embodiments, the aptamer molecular photonic beacon testing device further includes a reference element operable to emit light in response to receiving a light excitation.

In some embodiments, the test vial receptacle further includes a movable part operable to displace the reference element from a rest position to a deployed position when a replaceable test vial is fully inserted in the test vial receptacle, the reference element being outside a field-of-view of the camera in the rest position and inside the field-of-view in the deployed position.

In some embodiments, the aptamer molecular photonic beacon testing device further includes at least one of a mobile device adapter and an aperture selector configured to adapt the lightproof enclosure to different mobile devices.

In some embodiments, the bandpass optical filter includes a gap configured to allow any light source through.

A second broad aspect is an aptamer molecular photonic beacon testing device for detecting a pathogen including: a lightproof enclosure configured to receive a test vial, the lightproof enclosure including at least a light source and a camera cell.

In some embodiments, the aptamer molecular photonic beacon testing device further includes a communication module operable to transmit information to a computing device and receive information from the computing device.

In some embodiments, the aptamer molecular photonic beacon testing device further includes a battery providing power to at least the light source and the camera cell.

A third broad aspect is a pathogen testing system including: an aptamer molecular photonic beacon testing device; and a replaceable aptamer molecular photonic beacon test vial configured to be placed in the test vial receptacle, the replaceable aptamer molecular photonic beacon test vial having a body being configured to receive a sample fluid from a tested subject, the test vial body including a solution of aptamer molecular photonic beacons and a carrier liquid medium, wherein the aptamer molecular photonic beacons are selected to bind to a protein, RNA or DNA of a target pathogen and further include a reporter molecule that is capable of receiving light and emitting light after binding to the target pathogen.

In some embodiments, the lightproof enclosure is configured to position the mobile device and the replaceable aptamer molecular photonic beacon test vial such that a light from the flash light source illuminates the replaceable aptamer molecular photonic beacon test vial and such that the camera is operable to capture the emitted light from the Aptamer Molecular Photonic Beacons.

In some embodiments, the reporter molecule emits light at a wavelength which corresponds to a peak sensitivity of at least one light sensor of the mobile device.

In some embodiments, an optical filter is configured to cover a lens of the camera while leaving the flash light source uncovered to limit a light received by the camera to a wavelength corresponding to an emission wavelength of the reporter molecule. In such a case, simultaneous excitation of the fluorophore and detection of the emission light can be possible. This is useful when the lifetime of the fluorescence is very short. This can also be useful for eliminating background light when ambient light is otherwise able to reach the camera.

In some embodiments, the replaceable aptamer molecular photonic beacon test vial includes an opaque seal surrounding a removable cap configured to be attached to the test vial.

In some embodiments, the replaceable aptamer molecular photonic beacon test vial is a test slat, the container being a top surface of the test slat.

In some embodiments, the pathogen testing system further includes a reflective sticker over a surface of the container.

In some embodiments, the reflective sticker includes a barcode.

A fourth broad aspect is a pathogen testing aptamer molecular photonic beacon test vial configured to be placed over a camera and a flash light source of a mobile device, including a molecular photonic beacon aptamer test solution, wherein the Aptamer Molecular Photonic Beacons are selected to bind to a protein, RNA or DNA of a target pathogen and further include a reporter molecule that is capable of receiving light and emitting light after binding to the target pathogen, a reflective or opaque material covering a surface of the test vial and having a first window for placement over the flash light source of the mobile device camera and a second window for placement over a lens of the camera of the mobile device, the second window having a bandpass optical filter area for absorbing at least the light from the flash light source while allowing the fluorescence light to reach the camera.

In some embodiments, the vial includes a lid covering a fluid chamber.

A fifth broad aspect is a mobile device readable non-transitory memory storing instructions executable by a mobile device, including: at least one instruction for causing a flash module of the mobile device to be operated; at least one instruction for at least one camera of the mobile device to capture an image of a vial including a solution of a test subject fluid, a quantity of Aptamer Molecular Photonic Beacons and a carrier liquid medium; at least one instruction for a processor of the mobile device to compute an infection status based on the captured image; and at least one instruction for the processor to display the infection status on a display module of the mobile device.

In some embodiments, the memory further includes at least one instruction for causing operation of the flash module to be stopped before executing the at least one instruction for at least one camera of the mobile device to capture an image.

In some embodiments, the memory further includes at least one instruction for storing at least one of the captured image and the infection status in a storage module of the mobile device.

In some embodiments, the memory further includes at least one instruction for sending at least one of the captured image and the infection status to a remote server.

In some embodiments, the memory further includes at least one instruction to scan a barcode or receive a code associated with the vial and to determine at least one of the state of a replaceable test vial and a target pathogen being tested.

In some embodiments, the memory further includes at least one instruction to prevent the mobile device from being operable to determine infection status when the state of the replaceable test vial indicates an invalid replaceable test vial.

In some embodiments, the memory further includes at least one instruction to confirm at least one of a presence of the replaceable test vial and a negative infection status test result by processing the captured image and identifying a reference element.

A sixth broad aspect is a method for detecting a pathogen including: starting a mobile device software testing application; adding a test subject sample fluid to a replaceable aptamer molecular photonic beacon test vial including a solution of Aptamer Molecular Photonic Beacons and a carrier liquid medium, wherein the Aptamer Molecular Photonic Beacons are selected to bind to a protein, RNA or DNA of a target pathogen and further include a reporter molecule that is capable of receiving light and emitting light after binding to the target pathogen; mixing a content of the replaceable aptamer molecular photonic beacon test vial; aligning the aptamer molecular photonic beacon test vial with a camera and a flash light source of the mobile device; and performing a test to detect a presence of the target pathogen by running the mobile device software testing application.

In some embodiments, the performing the test includes causing the flash light source to be operated and the camera to capture an image of the replaceable aptamer molecular photonic beacon test vial.

In some embodiments, the method further includes at least one of computing an infection status based on the captured image and displaying the infection status on a display of the mobile device.

In some embodiments, the method further includes storing at least one of the captured image and an infection status in a storage module of the mobile device.

In some embodiments, the method further includes sending at least one of the captured image and the infection status to a remote server.

In some embodiments, the method further includes scanning a barcode with the mobile device to determine at least one of the states of a replaceable test vial and a target pathogen being tested.

In some embodiments, the method further includes preventing the mobile device from being operable to determine infection status when the state of the replaceable test vial indicates an invalid replaceable test vial.

In some embodiments, the method further includes confirming at least one of a presence of the replaceable test vial and a negative infection status test result by processing the captured image and identifying a reference element.

A seventh broad aspect is a medical test vial configured to be inserted in a medical testing device receptacle, wherein the medical test vial comprises a body configured to receive a sample fluid from a tested subject and at least one alignment structure configured to orient the medical test vial inserted in the medical testing device receptacle.

In some embodiments, the at least one alignment structure comprises at least one alignment tab on a side of the medical test vial.

In some embodiments, the at least one alignment structure comprises at least one alignment tab on a side of the medical test vial and at least one shifted alignment tab on another side of the medical test vial.

In some embodiments, the at least one alignment structure comprises at least one groove on a side of the medical test vial.

In some embodiments, the at least one alignment structure comprises at least one groove on a side of the medical test vial and at least one shifted groove on another side of the medical test vial.

In some embodiments, the at least one alignment structure extends over a length of the body.

In some embodiments, the at least one alignment structure is the body.

In some embodiments, the body has one of a trapezoidal shape, a triangular shape and a pentagonal shape.

In some embodiments, the medical test vial further includes a medical test vial cap configured to be fixed to the body, wherein the medical test vial cap comprises at least one light lock.

In some embodiments, the at least one light lock is one of a groove and a ridge.

In some embodiments, the body and the medical test vial cap further comprise a threaded section configured to allow the medical test vial cap to be screwed to the body.

In some embodiments, the medical test vial further includes a label applied on at least one side of the body, wherein an inward face of the label is reflective and an outward face of the label is configured to present information relating to a content of the medical test vial.

In some embodiments, the label is applied on all sides of the body, except on a transmission side of the body.

In some embodiments, the information includes a barcode to identify at least one of the content of the medical test vial and the medical test vial.

An eight broad aspect is a medical testing system comprising: a medical test vial; and a medical testing device configured to receive the medical test vial in a test vial receptacle.

In some embodiments, an aptamer molecular beacon test kit is provided with the excitation wavelength of the fluorophore being selected to correspond to the blue-spectrum LED that is typical of camera flash white light sources of smartphones. In this way, the test kit can be made flexible in that it can be efficiently analyzed using a smartphone and a dedicated analyzer device, as desired. The test kit can comprise a test probe or test vial that receives saliva or another bodily fluid. When a test probe or vial is not fashioned to provide a suitable light enclosure, a separate enclosure can be provided for the test kit or analyzer device. Accordingly, a medical testing probe or vial may comprise a quantity of aptamer molecular beacon molecules having a stem sequence, loop sequence, fluorophore reporter and a quencher in an unbound state in which the quencher is proximate the fluorophore reporter to prevent fluorescence, wherein the stem sequence selectively binds to a target to become in a bound state in which the quencher is remote from the fluorophore reporter to allow fluorescence. The medical testing probe or vial can be for use with a smartphone-based testing apparatus, and an excitation wavelength of the fluorophore reporter can be between about 450 nm and 470 nm.

In some embodiments, the test probe or vial can be provided with multiple aptamer molecular beacons that target different pathogens so that a single test can detect any of a plurality of pathogens, such as a group of viruses. When the fluorophores of each different aptamer molecular beacon has a different emission wavelength, independent simultaneous detection of the plurality of pathogens can be achieved.

BRIEF DESCRIPTION OF THE DRAWINGS

The invention will be better understood by way of the following detailed description of embodiments of the invention with reference to the appended drawings, in which:

FIGS. 4A-4B are schematic drawings of an exemplary aptamer molecular photonic beacon testing device fixed to a mobile device;

FIG. 4C is a schematic drawing of an exemplary stand-alone aptamer molecular photonic beacon testing device which includes a light source, a camera module and a communications module;

DETAILED DESCRIPTION

Figure 1:
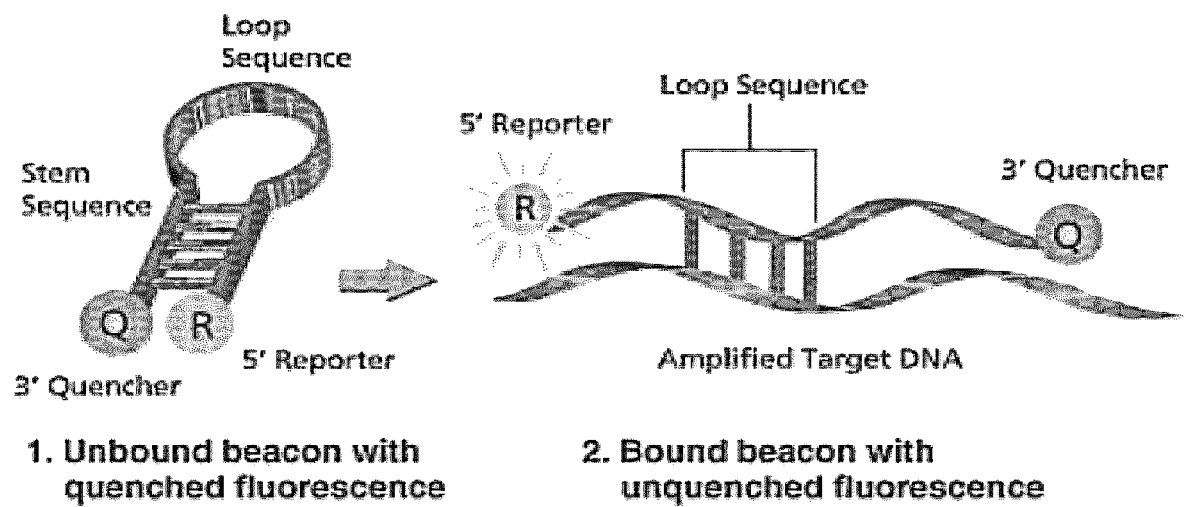
FIG. 1 is a composite illustration of a fluorescence Aptamer Molecular Beacon in a folded and attached position, as found in the prior art.
Figure 2:
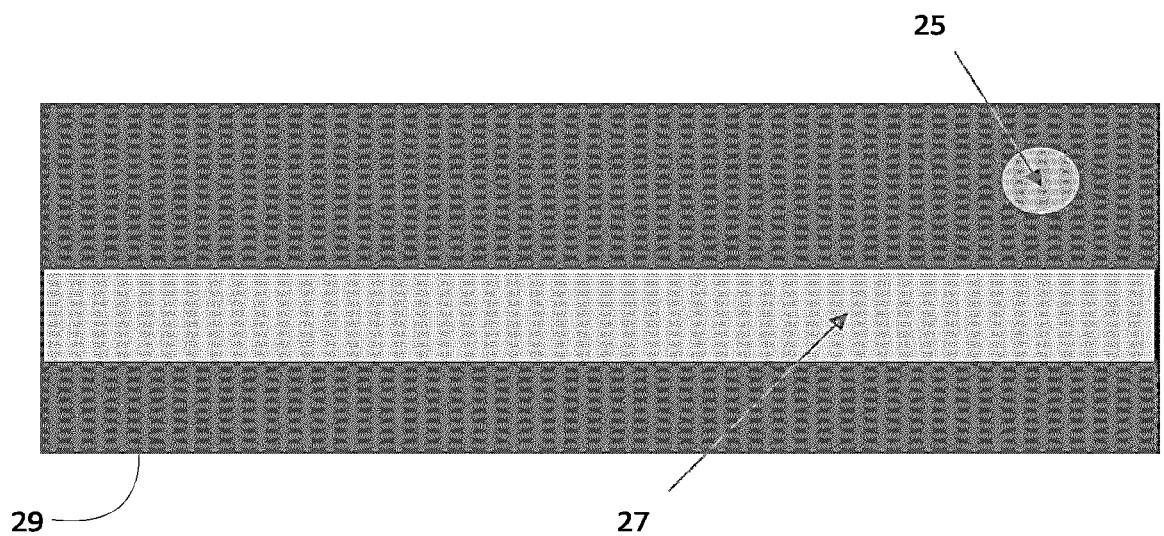
FIG. 2 is a schematic of an exemplary aptamer molecular photonic beacon testing device for a mobile device.

Recent advances in bioscience have made it possible to detect pathogens without the complex methods being employed up to now. These Aptamers Molecular Photonic Beacons bind to specific pathogens that can in turn emit light when being bound to the target pathogen. Devices such as smartphones have the computing means to analyze the results and provide the conclusion, and store the results locally or communicate them, if so desired.

Additionally, certain medical tests may now be performed by the general public, in the comfort of their home with devices available for everyone. As a matter of fact, testing to detect the presence of a substance in a patient's sample (e.g. saliva, nasopharyngeal fluid, blood, etc.) may now sometimes be effected through non-specialized medical equipment. While testing for certain things, such as sugar blood levels for patients with diabetes, have been performed by patients with dedicated testing devices for a long time, new technologies are expanding the array of conditions, pathogens and substances being able to be detected by a testing device to be operated by a patient.

Numerous new technologies thus provide patients with a testing kit to be used following the included indications. The testing kit may include a medical testing device and a testing vial to be inserted inside the medical testing device. The testing vial may include a solution which, when mixed with a sample fluid from the patient, react and allow the medical testing device to detect the presence of a condition, a pathogen or a substance.

While most patients may operate the medical testing device according to the indications specified with the testing device, a mispositioning, misalignment or misorientation of the testing vial inside the testing device receptacle may lead to erroneous testing results. While some testing device may be able to detect the mispositioning, misalignment or misorientation of the testing vial inside the testing device, the testing as a whole may be improved by specifically designing the testing vial such that it may necessarily prevent any issues when it is inserted inside the testing device.

Similarly, some medical testing device uses optical properties of the tested sample and may be adversely affected by a leakage of ambient light in the enclosure in which the testing vial is placed, which may happen when the testing device is not properly used and the light seal is not efficiently placed. Results from the operation of the medical testing device with a partially operative light seal may vary and may include erroneous results not representative of the true state of the sample being tested. For example, when testing for the presence of a given pathogen in the saliva of a patient, a medical testing device using optical properties being operated with a partially effective light seal may give a false negative result due to the light sensor (e.g. camera) being saturated by the ambient light leaking inside the test enclosure. This is particularly an issue for detecting a small number of fluorescent particles in a sample, which requires a very high photosensitivity of the light sensor.

While medical testing devices may be designed similarly to existing specialized testing devices (e.g. spectrometer, etc.) which generally require the full insertion of the testing vial inside the test enclosure, it may not be desirable as it may be more voluminous (e.g. access panel, room for the complete vial inside the testing area plus additional spacing for securing/removing the vial in place, etc.) and may increase the chances of damaging the structure and sensors. This is a significant issue for testing devices designed to be distributed to the general public, as they will be operated by untrained users not necessarily conscious of the damage they could do to the device during its operation.

In the existing specialized testing devices, the enclosure for inserting the testing vial may generally be surrounded by a light seal, for example a flexible rubber structure, which may effectively provide a sufficient light seal once the testing device's cover is secured with its base (i.e. pressing both structure together such that the light seal becomes compressed between both and results in a complete light seal).

For a general public use, the testing as a whole may be improved by specifically designing the medical testing device such that the testing vial is inserted in a receptacle with an opening on the exterior side of the device. Such design may limit the amount of damage that a user operating the device may do to the sensor and other internal structure (e.g. optical filters, mirrors, etc.) while further allowing a minimal form factor for the device. The testing as a whole may be improved due to the reduction of potential false positives and negatives which may be otherwise result from an erroneous operation of the device.

However, for such design, there needs to be a light seal surrounding the cap of the testing vial to prevent ambient light from leaking inside the vial's receptacle. While the light seal may be on the testing device's receptacle (e.g. a flexible seal which may at least partly cover the testing vial's cap) it would be preferrable to have the seal directly on the testing vial's cap. As a matter of fact, a light seal included on the testing device may lead to increased operation difficulty as the insertion/removal of a testing vial inside the receptacle would be harder or more complex and may require an additional mechanism to push out the testing vial from the receptacle for removal, as it may not be easily feasible to pull the vial from its cap when fully inserted inside (since the cap would be required to be beneath a flexible light seal).

Aptamers

Aptamers are single stranded nucleic acid molecules or peptide molecules that fold into complex three-dimensional conformations that can selectively bind to a specific target, including proteins, peptides, carbohydrates, small molecules, toxins, and even live cells. Aptamers assume a variety of shapes due to their tendency to form helices and single-stranded loops. Aptamers can be developed to bind to any desired target. The aptamer can be generated via in-vitro selection or via SELEX (systematic evolution of ligands by exponential enrichment) ranging from metal ions to cells. On the molecular level, the aptamers will bind to its cognate target by non-covalent interactions. As such, aptamers may be specifically designed to bind to any pathogens (e.g. viruses, bacteria, spores, etc.) to help in diagnosis or to deliver drugs to specific cells inside a patient. One such aptamer has been proven to bind to SARS-CoV-2 S1 spike protein on the surface of the virus. Other Aptamers can be chosen or designed to bind to other proteins or RNA or DNA of other viruses and pathogens.

Fluorophores

Fluorophores are molecules that can be very small, <1200 Daltons that may be attached to one end of the aptamer. One such fluorophore that exhibits the desired properties that match the characteristics of the smartphone LED and cameras is Atto 465 (e.g. from Sigma Aldrich). As described herein, the fluorophore may be used as the reporter in an Aptamer Molecular Photonic Beacon.

Quencher

A quencher is also a small molecule that can be attached to the opposite end of the aptamer than the fluorophore. The quencher, while in proximity with the fluorophore, absorbs the energy from the fluorophore that would otherwise be emitted. On separation from the fluorophore, the quencher stops being operable to absorb this energy, therefore allowing the fluorophore to emit light. This separation occurs, in an appropriately designed aptamer, on binding to the target protein, RNA or DNA. One quencher that will attach and quench the Atto 465 fluorophore is the Iowa Black® Fluorescence Quencher.

Aptamer Molecular Photonic Beacons (AMPB)

As illustrated in FIG. 1, a molecular beacon may be an aptamer with the fluorophore, which is the AMPB reporter, and quencher attached at the two end of the aptamer held in a hairpin-loop conformation (around 20 to 25 nucleotides) by complementary stem sequences (around 4 to 6 nt) at both ends of the probe. The 5' and 3' ends of the probe contain a reporter and a quencher molecule, respectively. The loop may be a single-stranded sequence complementary to the target sequence. The proximity of the reporter and Quencher causes the quenching of the natural fluorescence emission of the reporter.

Aptamer Molecular photonic beacons hybridize to their specific target sequence causing the hairpin-loop structure to open and separate the reporter and the quencher. As the Quencher is no longer in proximity to the reporter, fluorescence emission may take place when the necessary excitation is provided to the molecule. Therefore, the measured fluorescence signal may be directly proportional to the amount of target pathogen. As a matter of fact, the more testing solution contains the target pathogen, the more Aptamer Molecular photonic beacons will be attached and have their reporter separated from their quencher (i.e. the fluorescence signal will be stronger). There are different 3D shapes and changes to the morphology of the Aptamer Molecular photonic beacons on binding to follow the change on binding. Similarly, the fluorophore and quencher conjugation to the aptamer may be different. In some cases, the quencher can be released.

As is known in the art, the fluorophore may be selected to emit light for a particular wavelength of absorbed light.

Aptamer Molecular Photonic Beacon (AMPB) Testing Device

As described herein, the Applicant has discovered a method of testing for a pathogen using a mobile device and an Aptamer Molecular Photonic Beacon solution. As a matter of fact, it is possible to select an AMPB with a fluorophore excitable by the main wavelength of the light emitted by a mobile device's flash. Given the optical properties of most cameras included in current mobile devices, the camera may be operable to detect fluorescence emitted by AMPBs bound to target pathogens. In order to detect low levels of emitted fluorescence, a bandpass filter may be required. The filter may thus allow the mobile device's camera to sense a small amount of the target pathogen, such as would be present in a patient in early stages of infection while further filtering out fluorescence from water in the solution and other contaminants in the saliva such as food particles and fruit particles.

In some embodiments, the bandpass filter may not be required for the system to properly function. As such, the bandpass filter may not be required when a sufficiently lightproof enclosure (i.e. no leakage of ambient light) and a fluorophore operable to emit light for a long enough period after the excitation light source has stopped are used. As a matter of fact, these may allow the testing device to flash the light source and to capture an image after the light source has been extinguished (i.e. the only light being captured would be the light emitted by the fluorophores, therefore no filter may be required).

In some embodiments, there AMPB may be selected to bind with a given surface protein of the severe acute respiratory syndrome coronavirus 2 (SARS-CoV-2, the virus causing COVID-19) and where the quencher and the reporter are chosen to be excited by a light source having approximately 450 nm and emit at 490 nm, or appreciably similar wavelength. Someone skilled in the art will appreciate the fact that the AMPB may be selected to bind to any pathogen.

In order to perform a diagnostic test to determine the infectious state of a person with regards to a target pathogen, a sample of the saliva or nasal mucus may be taken with a swab and inserted into a vial. The vial contains the AMPB and a carrier liquid medium, such that when the vial is shaken the person's saliva or nasal mucus may mix with the AMPB and carrier liquid medium.

Reference is now made to FIG. 2, which is a schematic of an exemplary aptamer molecular photonic beacon testing device for a mobile device. In this embodiment, a fixture 29, which may be a lightproof enclosure, contains a slot for a mobile device 27 (e.g. smartphone, tablet, etc.) and a receptacle for a test vial 25. The receptacle for the test vial 25 may be a slot and may be positioned inside the fixture 29 such that the distance from the vial to the flash of the smartphone and the distance between the vial and the camera lens selected to gather the light emitted by the reporter is constant within a small covariance. This ensures that the Beer-Lambert law calculations in the mobile device application may be respected. Someone skilled in the art will appreciate that, as such, the extinction ratio of the medium is known, the distance from the flash is known and the light flux is known.

In some embodiments, the slot for the mobile device 27 may be a coupler which effectively joins the mobile device to the fixture 29. For example, a relatively small fixture 29 may be positioned over a mobile device, such that it only covers an area over a camera and a flash of the mobile device. In such example, the slot for the mobile device 27 may be replaced by the connection between the mobile device and the fixture 29, which is herein defined as a coupler. The coupler may be lightproof, such that no ambient light may leak to the inside of the enclosure/fixture 29. In some embodiments, the coupler may be a mobile device cover that fits over the mobile device and holds the other parts of the testing device in the required position over the flash and camera(s).

FIG. 3A illustrates internal components of an exemplary aptamer molecular photonic beacon testing device for a mobile device. In this embodiment, a mobile device 39 (e.g. smartphone, tablet, etc.) may be inserted inside the fixture's 29 slot for the mobile device. As the mobile device 39 is positioned correctly inside the slot, its flash 33 and camera 37 may be aligned with their associated apertures in the fixture 29 and thereafter also aligned with the test vial 31. The test vial 31 may be inserted in the fixture's 29 slot for the test vial, such that the vial is correctly positioned to allow its content to be illuminated by the flash 33 and for its potential fluorescence to be detected by the camera 37.

The mobile device's 39 camera 37 may be aligned with a filter 35, which may be a notch optical filter specific to 490 nm (e.g. a bandpass filter with a narrow band around 490 nm). As the mobile device's 39 may have a flash 33 made of Light Emitting Diodes that have a fundamental light emission between 450 to 460 nm, the fluorophore may emit light at around 490 nm such that it may be the only light to pass-through the filter 35. In some embodiments, the optical filter may include a small gap to allow any light to pass-through, such that an aligned camera may sense the intensity of flash and may be able to confirm the presence of a vial inserted in the vial's receptacle. In some embodiments where the filter is not required, as described herein, the detection of the vial may be done by capturing a first image of the vial while the light source is operating. The testing may subsequently be done by operating once more the light source and thereafter capturing an image once the light source has extinguished (such that only a presence of fluorophores may be emitting). Someone skilled in the art will appreciate that it may be feasible to continuously capture a series of image, some of them being while the light source is operating (i.e. confirming the presence of the vial) and some of them after the light source has extinguished.

The reporter quantum efficiency and the absorbance of the light by the liquid medium will determine the light emission quantity in number of photons. As mobile devices 39 have different of cameras and that some mobile devices may have multiple camera sensors, the testing system, through the control application, may select the camera lens with the highest quantum efficiency for the testing, this being about 75% at 490 nm. Additionally, any image processing capabilities of smartphones or other mobile devices may be used to enhance the image captured during the test. These capabilities may include post-processing software, which may include artificial intelligence image processing. This may enhance the sensitivity of the test and therefore allow for detection of the target pathogen in relatively small quantities.

The sensors in the smartphone or similar device can use a single cell of the camera sensor or a plurality, or all, the cells of the sensor to calculate the results of the test performed. This maybe done immediately as part of the test process or stored over time and multiple tests and then analyzed. The fluorophore emission light can be taken from a specific region of interest within the acquired image. Spatial intensity analysis can be used to confirm that the intensity observed matches intensity from the expected distribution of the aptamer within the solution of the vial.

It will be appreciated that the test result can apply a simple threshold to the total amount of light observed to give essentially a binary result, or the amount of light received can be used to qualify or quantify the result. This can allow the positive or negative result to be qualified with a confidence value that health care professionals can consult. In some tests, the amount of light in the acquired image can be used to be correlated with a disease state or disease severity.

The fluorophore can have a lifetime that will permit the emission light to be captured by the mobile device's camera once the flash light source is turned off.

A reflector may further be placed behind the vial to reflect any light emitted by the fluorophore back to the camera, similarly a tube can be placed between the vial and the camera to eliminate any external light from effecting the reading. A similar absence of ambient or external light maybe achieved by another means as well.

FIG. 3B illustrates an exemplary aptamer molecular photonic beacon testing device setup comprising a mobile device 39 inserted in the enclosure. In this embodiment, the fixture 29 may have a long form factor such that the testing device may be placed on a mostly horizontal surface (e.g. a table, counter, desk, etc.) without tilting over or moving throughout the test. As a matter of fact, a smaller form factor may be prone to tilting or moving once the mobile device 39 is inserted at one end of the device. It will be appreciated that any different form factor may be used for the testing device as it may be specified to hold the device throughout the test in the accompanying testing method description.

Figure 3A:
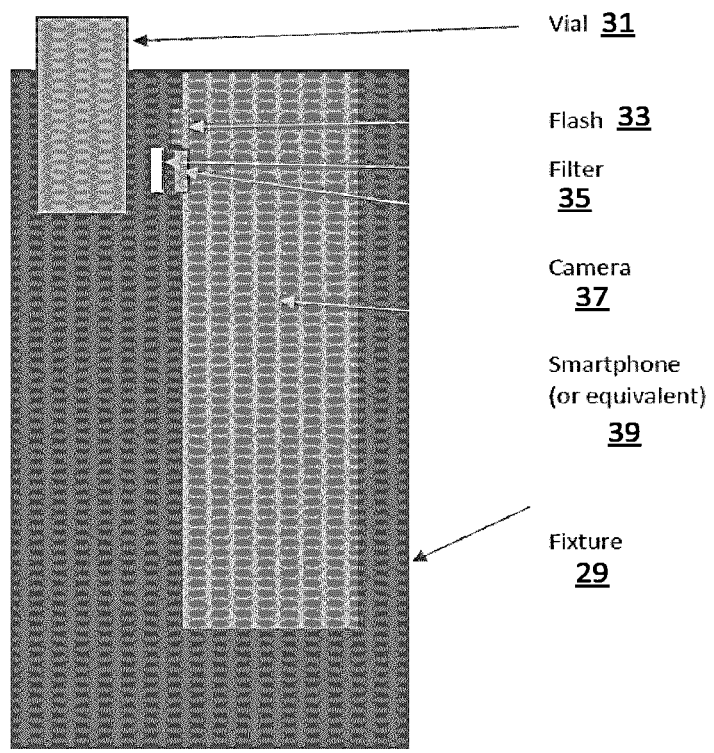
FIG. 3A is a schematic illustrating some internal components of an exemplary aptamer molecular photonic beacon testing device for a mobile device.
Figure 3B:
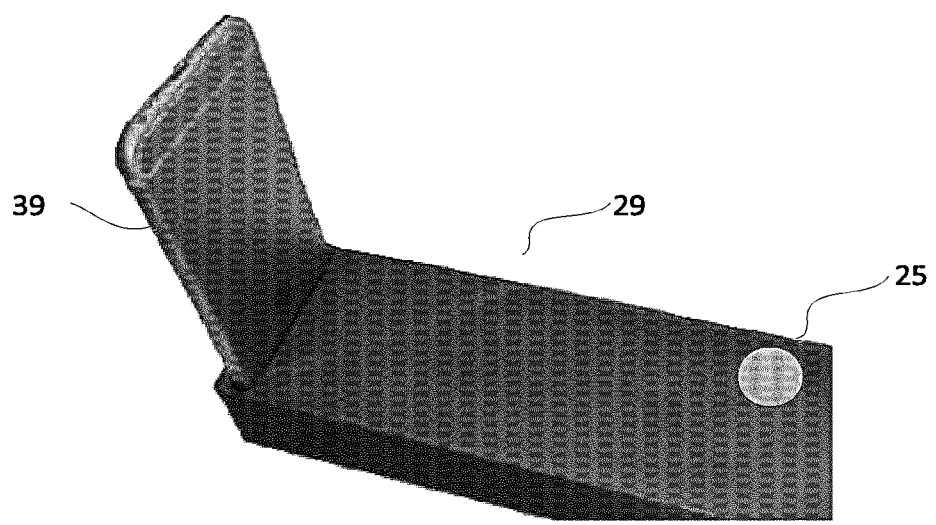
FIG. 3B is an illustration of an exemplary aptamer molecular photonic beacon testing device setup comprising a mobile device inserted in the enclosure.

In the embodiment of FIG. 3B, a test vial slot 25 in the fixture 29 is included on the opposite side of the mobile device's 39 slot. The test vial slot 25 may be aligned with the mobile device's 39 camera(s) and flash. As such, the test vial slot 25 may be positioned differently depending on the model of mobile device 39 to be used in the testing device. The test vial slot 25 may be a cavity which may be completely covered by an opaque vial cap, such that no ambient light may enter inside the fixture's 29 testing chamber.

Figure 3C:
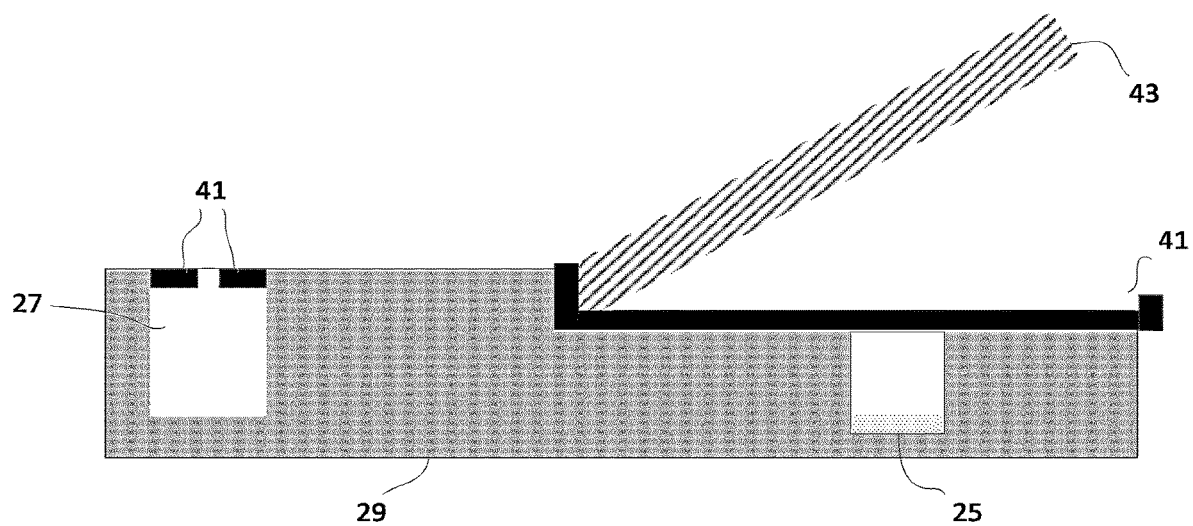
FIG. 3C is a schematic of an exemplary aptamer molecular photonic beacon testing device with a gated access to the sample enclosure.

FIG. 3C is a schematic of an exemplary aptamer molecular photonic beacon testing device with a gated access to the sample enclosure. In this embodiment, the mobile device slot 27 may have an opaque seal 41 enclosing its opening in the fixture 29, such that no ambient light may leak through the opening into the testing chamber. Ambient light leakage may otherwise impact the mobile device's camera(s) sensors to a point where their sensibility to the fluorescent light that may be emitted by a tested sample in a test vial is detrimentally affected.

In the embodiment of FIG. 3C, there may be a gate 43 providing an easy access to the test vial slot 25. Similar to the opaque seal 41 surrounding the mobile device slot 27, an opaque seal 41 may surround the gated access point. As such, when the gate 43 is closed and pressed against the fixture 29, the opaque seal 41 may prevent any ambient light from leaking inside the testing device.

Figure 3D:
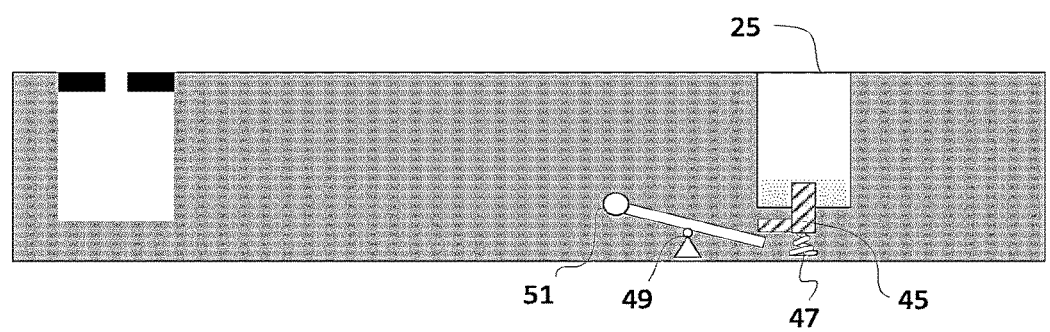
FIG. 3D is a schematic of an exemplary aptamer molecular photonic beacon testing device with a sample engagement and reference unit.

Now referring to FIG. 3D, which is a schematic of an exemplary aptamer molecular photonic beacon testing device with a sample engagement and reference unit. In some embodiments, it may be desirable to include a system that may indicate whether the test vial is correctly and completely inserted inside the test vial slot 25. This may be necessary to ensure that an opaque seal is properly formed by a test vial cap (i.e. no ambient light may leak and impact test results) or that all of the part in which the vial is filled by the mix of AMPB, carrier liquid medium and sample from the test subject is exposed to the light source (e.g. flash). Additionally, this system may be used as a reference point to calibrate the mobile device's camera(s) and/or to show that a negative test has been successfully completed and is not the result of an error or malfunction.

For example, FIG. 3D illustrates a mechanical engagement and reference system in which the complete insertion of a test vial inside the test vial slot 25 pushes an engagement member 45 towards a bottom of the fixture 29. The engagement member 45 may thereafter push a rotary member 49 on which is fixed a fluorescent part 51. The engagement member 45 may be connected to a biasing member 47 (e.g. a compression spring) which may reset the engagement and reference system to a resting position once a test vial is removed from the test vial slot 25.

In its resting position, the fluorescent part 51 of the engagement and reference system may be outside of the field-of-view of the mobile device's camera(s). When a test vial is fully engaged and the engagement and reference system is in its deployed position, the fluorescent part 51 may be inside the field-of-view (FoV) of the mobile device's camera(s). The deployed position of the engagement and reference system may be positioned such that it does not interfere with the detection of AMPBs from the test vial while remaining inside the FoV of the camera(s). This may be particularly useful to ensure that no malfunction happened during a test, mostly for a negative test result.

As a matter of fact, a negative test result necessarily means that no AMPBs emitted light, or that an insignificant number of AMPBs emitted light. Thus, a negative result for a test may be the detection of a completely dark testing chamber inside the testing device. Some device or mobile device application failures or malfunction may lead to similar results, such as the non-operation of the flash, an issue with the flash and/or camera controls, etc. This may mean that a false-negative result may be given to the person being tested, potentially leading to the person unknowingly spreading the disease.

When equipped with an engagement and reference system such as the one described herein, the fluorescent part 51 may be present in the sensed picture. Thus, while there may be no light emitted from the test vial (i.e. negative test result), the test may be confirmed as having successfully taken place by the recording of the fluorescent part 51 being in the FoV.

Someone skilled in the art will appreciate that any other configuration of an engagement and reference system may be used without departing from the teachings of this disclosure. Systems may also be used for only one of the functions of the described engagement and reference system (e.g. only for engagement of the vial or only for the reference). As such, other mechanical configurations or other systems (e.g. electrical, magnetic, etc.) may be used in lieu of the one described herein. Optical engagement and reference system may use other light sources (e.g. phosphorescent). A static reference system may be used, in which a fluorescent part 51 or equivalent is fixed at the "deployed" position (i.e. always in the FoV of the camera(s)).

Figure 3E:
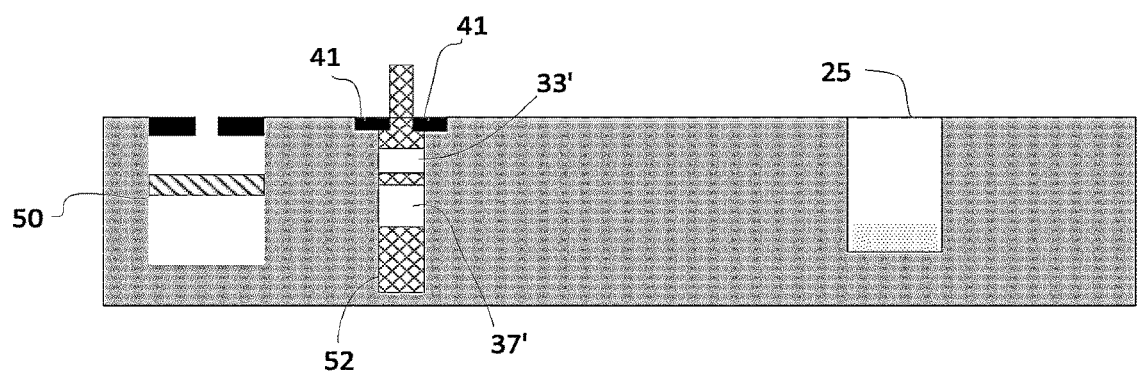
FIG. 3E is a schematic of an exemplary aptamer molecular photonic beacon testing device with a removable flash and camera apertures part.

Now referring to FIG. 3E, which is a schematic of an exemplary aptamer molecular photonic beacon testing device with a removable flash and camera apertures part 52. As there are a significant number of mobile devices on the market, it may be desirable to have a modular AMPB testing device fixture 29 design. The mobile device slot may be adapted to fit most smartphones (most tablets in a bigger fixture, etc.). In order to ensure the position of the mobile device inside the slot, such that the flash and camera are correctly positioned and do not move during the test, the device may include a replaceable mobile device adapter 50 configured to fit around the mobile device and resting on the sides of the mobile device slot. The testing device may thus have a mobile device adapter 50 specific for the mobile device being used for the test.

Similarly, as the size and the positioning of the flash and camera(s) differs between mobile device models (and its position inside the mobile device slot), a replaceable aperture selector 52 may be inserted in the fixture 29 in an aperture selector slot that may be positioned between the mobile device slot and the test vial slot 25. The aperture selector 52 may include the necessary flash aperture 33' and the one or more camera apertures 37' that are associated with the mobile device to be used and inserted inside the mobile device slot. Additionally, the opening of the aperture selector slot on the fixture 29 may include an opaque seal surrounding the area.

Using different mobile device adapters 50 and their associated aperture selector 52 may allow the user of the testing system to operate it with multiple different devices. This may be particularly useful for businesses in which different operators may perform the tests and may not necessarily use the same mobile device.

Figure 3F:
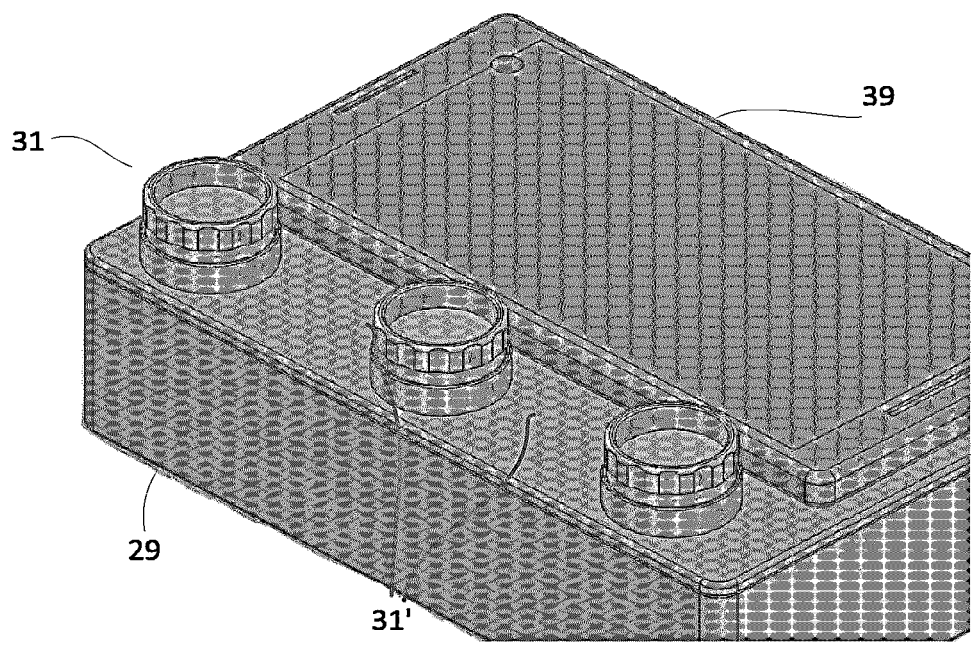
FIG. 3F is an illustration of an exemplary aptamer molecular photonic beacon testing device with an horizontal mobile device position and receptacles for three vials.

Now referring to FIG. 3F which illustrates an embodiment of the aptamer molecular photonic beacon testing device with an horizontal mobile device 39 position and receptacles for three vials 31, 31'. In this embodiment, the testing device fixture 29 may be of a generally rectangular shape in order to accommodate a mobile device 39 on the side of a number of vials 31, 31'. While the testing device fixture 29 may be of any other shape, a rectangular shape may be advantageous to limit the fixture's 29 size while allowing a mobile device 39 (rectangular) to be fully supported on the fixture.

The testing device fixture 29 may include one or more mating apertures to reciprocate the flash light source and the camera from the mobile device 39. These apertures may be combined in one bigger aperture, such that the fixture 29 may cater to several different mobile devices 39. The one or more apertures may be surrounded by a light seal to provide a sufficient light seal between the mobile device 39 and the fixture 29, such that no light may leak inside the container and skew the results.

In this embodiment, there may be three receptacles for testing vials 31, 31'. While one test vial 31 may have a patient's sample to be tested, the remaining vials 31' may be calibration vials to be used either before every test or after any number of tests has been done (e.g. before the first test of the day a calibration may be required, every time the mobile device 39 is removed from the fixture 29, once every ten tests, etc.). Having the extra vial receptacles on the fixture 29 itself allows for increased efficiency when testing a significant number of patients. It further allows to ensure the calibration vials 31' remain in good condition to be used for a longer period of time.

Figure 3G:
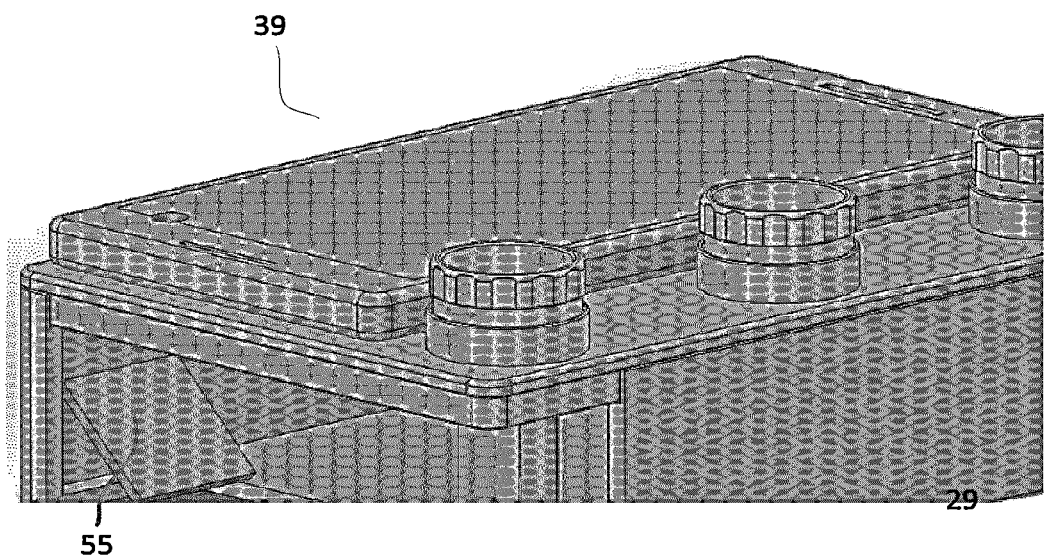
FIG. 3G is an illustration of the internal configuration of an exemplary aptamer molecular photonic beacon testing device with an horizontal mobile device position and receptacles for three vials.

FIG. 3G shows the internal configuration of the embodiment presented in FIG. 3F. As the mobile device 39 and the vial being tested are not aligned (such that the vial is in the direct field of view of the flash light source and the camera), the enclosure inside the fixture 29 may include a reflective element 55 (e.g. a mirror). Although not shown in this figure, the receptacles for the two vials which are not aligned with the reflector 55 may be in opaque enclosures (i.e. they are not illuminated by the flash light source once it is activated). Therefore, a test or a calibration will only evaluate the response of the content in the vial aligned with the reflector 55.

FIGS. 4A-4B illustrates exemplary embodiments of an aptamer molecular photonic beacon testing device directly fixed to a mobile device. As such, the testing device fixture 29 may be attached to the mobile device 39 with a clamp 53. The fixture 29 may be further attached to the mobile device 39 through a specifically purposed case (e.g. phone case, tablet case, etc.). In order to retain the smallest form factor possible, the test vial slot of the fixture 29 may not necessarily be aligned with the flash 33 and the camera 37 of the mobile device 39. As such, a sample vial 31 inserted in the test vial slot may be aligned with the camera 37 and the camera aperture 37' only. In such embodiments, the fixture 29 may include a mirror 55 to redirect the light source from the flash 33, through the flash aperture 33', towards the sample vial 31. As further described herein, the fixture 29 may include a filter 35 between the sample vial 31 and the camera 37. Additional optics to capture more light from the vial may be added to the system without departing from the teachings of this disclosure. As such, the system may include mirrors, lenses, filter for the light source and any other optical device that may improve or change some optical characteristics inside the enclosure, the test vial or other structure of the test system as described herein.

To prevent any ambient light from degrading the test results, the fixture 29 may further include an opaque seal 41 between the fixture 29 and the mobile device 39, the seal effectively surrounding the apertures for the camera(s) 37' and the flash 33'.

FIG. 4C is a schematic drawing of an exemplary standalone aptamer molecular photonic beacon testing device which includes a light source 33, a camera cell 37 and a communications module 38. While the aptamer testing device described herein may typically use a mobile device as an efficient device that includes numerous of the systems required for the test, such as a light source, a camera, a processing and calculations mean, the aptamer testing device may equivalently function without a mobile device if the testing device fixture 29 includes all necessary system components.

As illustrated in the embodiment of FIG. 4C, the fixture 29 may be an opaque cylindrical container with sufficient place inside the container to insert a test vial. As such, it will be understood that the shape of the fixture 29 may take any necessary form to accommodate a test vial. A fixture removable cap 36 may be fixed and remove from the fixture 29 to allow access to the container in order to add/remove a test vial. The fixture 29 may include, on a surface to which the content of a test vial would be exposed to, a light source 33 and a camera cell 37. The light source 33 may be a light emitting diode similar to the ones found in mobile device's flash. The camera cell 37 may be specifically sensitive to the wavelength emitted by the fluorophore used in the aptamer contained in a test vial to be used inside such device. The light source 33 and camera cell 37 may have all necessary components to function and be controlled.

The embodiment of FIG. 4C may further include a communications module 38 that may establish a wireless connection to any computing device (e.g. mobile device, computer, etc.). The communications module 38 may use WiFi protocols, Bluetooth protocols or any other protocols allowing exchange of data packets between the testing device and a computing device. In some embodiments, the communications module 38 may include a port such as to allow a wired communication to a computing device. In some embodiments, the communications module 38 may allow a software application running on the connected computing device to control the operation of the light source 33 and of the camera cell 37. As such, the computing device may trigger the light source 33 for a given time and thereafter trigger the capture of the image of the test vial to detect any light emissions from the fluorophores.

Someone skilled in the art will appreciate that other means of triggering the different testing sequence may be used. For example, a test button may be included on the fixture 29 or on the fixture removable cap 36 to trigger the test. The captured image may be automatically transferred to a paired computing device to which the communication module 38 is connected to. The captured image may further be recorded on an on-board non-transitory memory unit, which may allow for subsequent transfer to a computing device.

The fixture 29 may further include a power source to provide sufficient power for the operation of the light source 33, the camera 37 and the communications module 38. For example, the power source may be a rechargeable battery, which may be recharged by connecting a power cable to a port included on the fixture 29. In some embodiments, the battery may be a replaceable battery in a compartment easily accessed.

Although described as communicating with a computing device to process the captured image data and assess the infection state of the tested person, it will be appreciated that the standalone testing device as presented in FIG. 4C may further include necessary electronic components (e.g. microprocessor, memory (transitory and non-transitory), etc.) to internally process all data and provide the infection state feedback without relying on a connected computing device. For example, the testing device may process the captured image data and light a green light or a red light depending on the determined infection state of the tested patient.

It will be further appreciated that any additional optics elements (i.e. filters, mirrors, lenses, etc.) may be added inside the fixture 29 or to the test vial to increase or change certain optical characteristics of the testing device and improve its efficiency at determining the infection state of a tested subject.

Figure 5J:
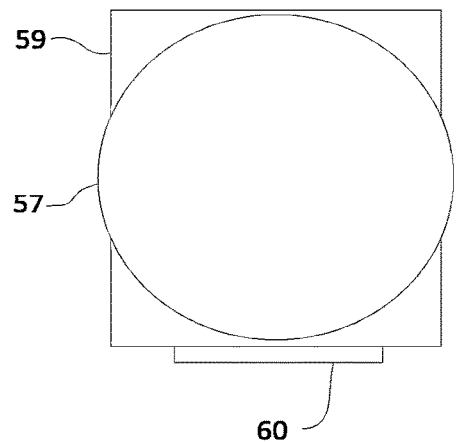
FIGS. 5A-5N are illustrations of exemplary aptamer molecular photonic beacon test vials and caps.

Now referring to FIGS. 5A-5K, which are illustrations of exemplary aptamer molecular photonic beacon test vials. AMPB testing vials may have any shape that can fit inside a testing device's test vial slot. As described herein, the testing vial may contain a mix of AMPBs and carrier liquid medium and may be opened to add the tested person sample fluid (e.g. saliva, nasal mucus, etc.). FIG. 5A illustrates an embodiment in which a bullet-shaped vial has a container 59 and a cap 57. The vial cap 57 may be twisted or pulled to be removed from the container 59, such that a sample fluid may be added to the mix contained in the container 59. The container 59 may be transparent such as to allow light to pass-through.

FIG. 5B illustrates an embodiment of a test vial in which the cap 57 includes an opaque seal 61. The opaque seal 61 may fit around the testing device's test vial slot, such that no light may leak through the opening to degrade the test results. Part of the cap 57 may extent upwards from the opaque seal 61 such that it may be manually inserted and removed from the testing device.

The detection of a limited number of fluorescent molecules in the tested sample may be improved by the presence of a reflective surface over the backside of the testing vial. As a matter of fact, with a very limited number of excited fluorescent molecules, there may not be enough photons being emitted towards the light sensor for the positive detection of the emission. However, as some of the fluorescent molecules may emit their light towards other directions than the light sensor, it may be beneficial to have a reflector (e.g. a mirror, a reflective surface, etc.) such that more photons are reflected and transmitted to the light sensor.

By providing a reflective label, at least on the back of the test vial (i.e. opposite side of the light source and light sensor), fluorescence emitted towards the opposite side of the light sensor may thus reach the light sensor after being reflected. This ensures an increase in sensitivity for the test, as the light sensor will provide a positive detection of the target pathogen and/or substance with potentially less emitting molecules inside the test sample.

Additionally, the optical medical testing device may not require a reflective surface, such as a mirror, in the device itself. Being fixed to the surface of the vial further improves the reflective properties, as it is inherently protected against contamination. A reflective surface included in the testing device may require cleaning to ensure similar conditions. The reflective coating of the label may thus always be operable to reflect the light, specifically at the wavelengths being used for the test, with reduced chances of aberrations.

While the inward face of the reflective label may have reflective properties, its outward face may present all the information required by the health authorities. As such, the reflective label replaces the information label that is necessarily required on each testing vial and provides both the information and the reflective properties for a similar price. This further simplifies the design of the medical testing device without adding new parts or complexities in the manufacturing of the medical testing vial.

Having a reflective label instead of a reflector included in the testing device is beneficial for a general public use of the testing device, as it may limit the amount of damage that a user operating the device may inadvertently do to the reflector. Additionally, the user of the testing device does not have to clean and maintain a reflector in good condition with the use of the reflective label.

The testing as a whole may thus be improved due to the reduction of potential false negatives (e.g. increased sensitivity of the test) and due to the ease of operation in the testing equipment.

FIG. 5C shows an embodiment in which part of the test vial's container 59 is covered by a barcode sticker 63. The barcode sticker 63 may be scanned by the mobile device being used for the testing and may ensure that the testing vial used is an official vial for the target pathogen being tested (i.e. quality control, it contains the relevant AMPBs and in sufficient quantity, etc.). It may also be particularly useful to scan a barcode to ensure that a test vial is not re-used by the person performing the test. Additionally, the barcode sticker 63 may have a reflective underlayer, such that when the test vial is positioned with the barcode sticker 63 facing away from the mobile device, the light may be reflected by its reflective underlayer. This may increase the sensitivity of the test and may replace the addition of a mirror inside the fixture.

In this embodiment, the reflective barcode sticker 63 may be fixed over a single surface of the testing vial which represents the surface opposed to the transparent surface in optical communication with a light source and a light sensor. However, if the testing vial is cylindrical, the reflective barcode sticker 63 may be placed in any position on the cylindrical wall and would necessitate the careful placement of the testing vial in the medical testing device to ensure obtaining indicative results (positioning the reflective barcode sticker 63 on the opposite side of the light source and light sensor).

In other embodiments, the barcode sticker 63 may be on the cap 57 or may be on a package containing one or more test vials. In yet another embodiment, the barcode sticker 63 may be replaced by any other means of confirming the source of the test vial, such as an RFID tag. In some embodiments, the sticker may strictly be a reflective sticker added to increase the sensitivity of the test.

FIG. 5D illustrates a different type of test sample support. The test vial may thus be replaced by a testing slide or substrate 62 over which the mix of AMPBs, carrier liquid medium and fluid from the tested subject may be spread. Someone skilled in the art will appreciate that any other shape may be used as a test "vial" and that the term "vial" should not be interpreted as limiting the scope of the present disclosure to a container-type test sample.

The embodiment illustrated in FIG. 5E may be used without any fixture 29 as a testing device. As such, the vial's container 59, which may be generally of rectangular shape, may include the necessary structures to allow the test. For example, the container 59 may have a reflective sticker 64 wrapped around all but one surface and a top of the container. No matter the shape of the vial, the arrangement of a flat side for optically coupling with the mobile device can be desirable. The reflective sticker 64 may thus prevent ambient light from passing through the sticker 64 into the container. The removable cap may be made out of opaque material such that, once placed on top of the vial's container 59, it may overlap with the sticker 64 to further prevent ambient light leaking inside the container 59. In some embodiments, the reflective sticker 64 may cover a bottom section (i.e. opposite of the cap) of the container 59. In other embodiments, the bottom section of the container 59 may have a bottom cap opaque structure that may provide easier hold of the vial when performing a test.

In this configuration, the light emitted, for example by fluorescent molecules in the testing vial, may be further reflected by most sides and thus increases the light transmitted towards the light sensor of the medical testing device.

A person skilled in the art will understand that, while describing the reflective sticker 64 as being operable to reflect the light inside the testing vial, such that it may be directed towards a transparent exit window of the vial, it may further be used for additional benefits. For example, when placed over all sides of the testing vial, with the exception of an exit window (optically communicating with a light source and a light sensor), the reflective sticker 64 may provide an effective light seal. As such, the reflective sticker 64 may also cover the bottom of the testing vial and may extend upwards in a fashion such that the vial's cap 57 may overlap the reflective sticker's 64 end.

The use of such a reflective sticker 64 covering most of the testing vial may enable the use of the testing vial without requiring a testing device in itself, or with a limited testing device. For example, an exit window of the testing vial's reflective label may be placed over a light source and light sensor. The testing vial may further have a light seal to ensure proper sealing at the physical connection between the exit window and the light source and light sensor (e.g. there may be a flexible material surrounding the exit window on the testing vial or the flexible material may be provided by the surroundings of the light source and light sensor).

In the embodiment of FIG. 5E, one side (A) of the vial's container 59 may be configured to be directly pressed against the mobile device's flash and camera structure. As such, this side (A) may include a pass-through area 33' for the flash light source to go through the surface into the content of the container. Additionally, there may be a filtered area with a bandpass optical filter 35 that may be placed over the camera(s) of a mobile device during a test.

Now referring to FIG. 5F, which is an embodiment of an exemplary medical testing swab which may be used as the medical test vials as defined herein. Certain medical testing swab may include the reactive regent normally found inside a medical testing vial's container directly in the tip of the swab. While not limitative, the medical testing swab may include a solid or gel regent at its tip, such that it may react with the patient's sample being recovered by the swab. For example, the medical testing swab may be used to collect nasopharyngeal fluids which may directly act on the regent found on the swab or in the tip of the swab. The swab may then be entered in the testing device such that it may analyse the result of the reaction between the tested patient's sample and the regent.

FIGS. 5G to 5K are illustrations of exemplary medical test vials with different types of alignment structures. These testing vials may fit inside a medical testing device's test vial receptacle designed to reciprocate an opposed structure to the vial's alignment structure, such that the vial may be inserted in a unique position and orientation. Having a single possible orientation and position is a significant improvement over prior art vials, as it allows the medical testing device to be used without any particular training. As a matter of fact, the vials may be required to be positioned and/or oriented in a particular way inside a testing device in order to produce viable results or to reduce certain types of errors. For example, the vials may include a sticker (e.g. identifying the provenance, content, date and any other necessary information) on a portion of the transparent container walls. A testing device may use a sensor to capture an image of the content of the vial under certain conditions. As such, if the sticker is oriented in front of the medical testing device sensor, it may partially or totally block the ability of the sensor to capture an image of the tested sample.

As described and illustrated herein, the medical testing vial may have any type of alignment structure to ensure it may only be inserted in a single manner inside the testing device. FIG. 5G illustrates a top view of an exemplary vial body 59 (or container) and cap 57 including alignment tabs 60 on two opposing sides. In this embodiment, the vial's body 59 may have flat surfaces and the two side surfaces (i.e. the surfaces on the side of the surface facing the camera) may include shifted alignment tabs 60. The shifted alignment tabs 60 may therefore ensure that the vial is inserted in the desired direction, as the vial would otherwise not enter the vial slot of the testing device. This may be required as the test vials may include a label/sticker on the surface opposite of a sensor from the testing device.

FIG. 5H is a side view of an exemplary medical testing vial with multiple alignment tabs 60 extending over a significant part of the medical testing vial body 59. As such, the alignment tabs 60 may be fitted inside reciprocating grooves of a test vial receptacle in a testing device. The alignment tabs 60 may extend over a significant part of the vial body 59, such as to ensure the absence of a vertical tilt of the vial inside a testing device. The vial's cap 57 may be any type of cap (e.g. twist cap, hinged cap, inserted cap, etc.) and may be of any shape to fit over the vial body 59. The cap 57 provides a seal to prevent the content of the vial body 59 from spilling outside, however the vial may be placed (i.e. upside-down) or moved (e.g. while mixing the vial's content by shaking).

A person skilled in the art will appreciate that the alignment tabs 60 are only one of the possibilities for ensuring the placement of the vial inside the testing device in the desired orientation and that any other means may be used equivalently without departing from the teachings of this disclosure. For example, a different number of alignment tabs 60 may be used, on a single or multiple surfaces of the vial body 59. Similarly, alignment tabs may be present in the testing device's test vial receptacle and the test vial may have reciprocating grooves.

FIGS. 5I and 5J illustrates an alternative embodiment of the testing vial with a single alignment tab 60 on a bottom part of the testing vial body 59. Similar to the embodiment described for FIGS. 5G and 5H, the single alignment tab 60 of FIGS. 5I and 5J may be sufficient to ensure a desired position and orientation of the testing vial inside a medical testing device.

Figure 5K:
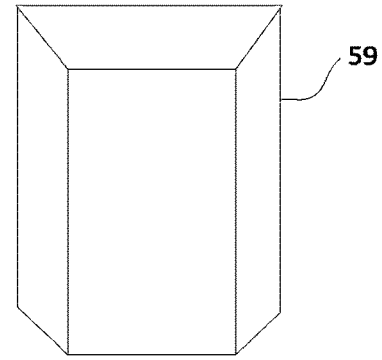

FIG. 5K illustrates an exemplary medical testing vial with a trapezoidal shape. In this embodiment, the vial's body 59 itself provides the alignment structure to ensure the correct positioning and orientation of the vial inside the medical testing device. While a trapezoidal shape may be particularly useful, as it provides two flat surfaces (e.g. one for a label/sticker for necessary information and one for facing the testing device's sensor), other shapes which are not symmetrical over their own internal axis may be equivalently used. For example, a medical testing vial may have a triangular shape (except equilateral) or a pentagonal shape. These other shapes may depend on the testing device's requirement for the sensor (e.g. may require a flat surface to reduce optical effects).

The surface of the vial required to be facing the testing device's sensor may be transparent to the desired wavelengths. For example, borosilicate glass may be used for the vial's body 59 as it may provide the necessary transparency.

In other embodiments, the alignment of the medical test vial may be done through its cap. As a matter of fact, the cap may provide structures mating in specific places on the testing device, such that it may be used for aligning the vial in the testing device. A person skilled in the art will understand that this embodiment may work particularly well with twist caps, such that a fully closed cap (twisted all the way close) will always be at a same position with regards to the vial's orientation (i.e. depending on where the threads start).

Figure 5L:
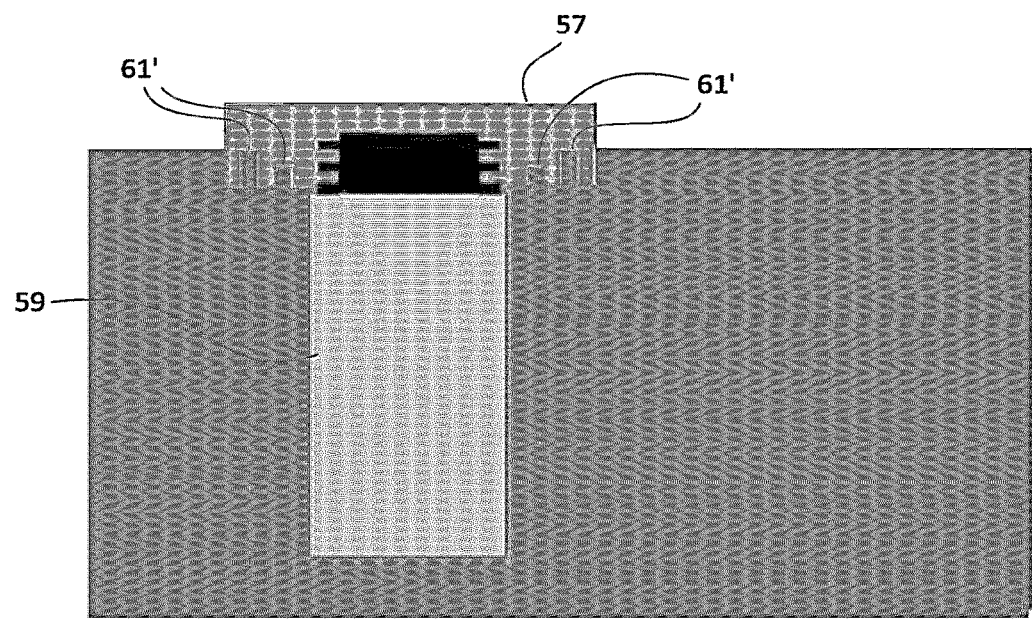

Now referring to FIG. 5L, which is a cross sectional side view of a medical testing device with a medical testing vial inserted in a vial receptacle, the medical testing vial having an exemplary twist cap 57 with a dual light lock 61'. The testing vial has a container 59 (or body) which may be clear such as to allow the optical detection of the desired substance contained in the container 59. For example, a medical testing device may use optical properties resulting from the physical and/or chemical interactions between a testing solution mixed with a patient's fluid sample (e.g. saliva, blood, etc.) that is comprised within the testing vial's container 59. The cap 57 may effectively provide a fluid seal, such that the fluids comprised within the container 59 may not leak even if the vial is being shaken. The cap 57 and its fixing mechanism with the vial's container 59 may be sufficiently rigid such as that the vial may be held and operated (inserted/removed from the testing device vial receptacle) by the cap 57.

In the embodiment of FIG. 5L, the cap 57 may be a twist cap 57. The cap 57 may therefore be screwed to a mating part of the testing vial's container 59. While a twist cap is preferred, as it provides both a good fluid seal and a good fixing mechanism with the container 59, other types of caps 57 may be used without departing from the teachings of this disclosure.

As described herein, the cap 57 includes a light lock 61' structure. FIG. 5L illustrates a double light lock 61' in the form of two grooves. The light locks 61' are designed to prevent ambient light from reaching the inside of the medical testing device, such that only the light source internal to the medical testing device may illuminate the content of the testing vial's container 59.

When inserting the testing vial inside the testing device's vial receptacle, the cap's 57 light lock 61' will lock with the reciprocating structure (e.g. ridges) of the medical testing device. As the production tolerances for both the grooves on the cap 57 and the ridges on the testing device may sometime result in a slight opening which may allow some ambient light to leak through, the use of a number of light lock 61' may be beneficial. As a matter of fact, with more than one light lock 61', the chance of ambient light leaking through is reduced to negligible levels. To provide an efficient light seal, the light locks 61' are continuous over the whole perimeter of the cap 57.

Using light locks 61' on the cap 57 may allow for enough of the cap 57 to protrude from the side of the medical testing device, such that the vial may be removed from the test device's receptacle once the testing is completed by simply pulling on the cap's 57 sides.

In some embodiments, the light locks 61' and/or another structure of the cap 57 may be configured to produce an audible sound (e.g. a 'click') and/or a tactile feedback when the vial is fully inserted into the vial's receptacle, such as to provide the user with a means to easily assess the position of the vial (i.e. fully inserted or not). The feedback mechanism may be implemented by any means known in the art, such as a small tab configured to be pushed by the cap once it reaches a certain insertion depth.

Figure 5M:
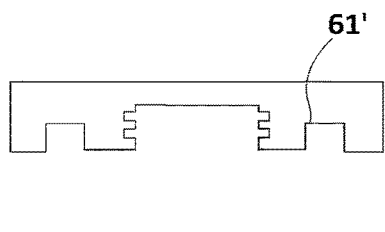
Figure 5N:
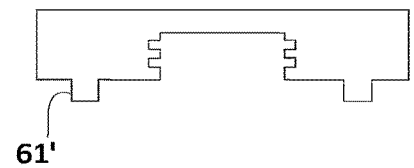

Now referring to FIGS. 5M and 5N, which are respectively a cross sectional view of an exemplary medical testing vial twist cap 57 with a single groove light lock 61', and a cross sectional view of an exemplary medical testing vial twist cap 57 with a single ridge light lock 61'. As described herein, the light lock 61' structure only requires an opposed and reciprocating structure on the medical testing device, such that the light lock 61' may mate with the surroundings of the testing vial's receptacle. The cap 57 further illustrates the threaded section to allow the twist cap 57 to be fixed to a vial container.

In such embodiment, a single light lock 61' may be sufficient to provide an ambient light seal. This may depend on the manufacturing process tolerances, the length and/or size of the light locks 61', the sensitivity or type of the test being performed, etc. The light locks 61' may cover the complete perimeter of the cap 57, at any distance between the threaded section 25 and the outer side of the cap 57.

A person skilled in the art will appreciate that the light lock 61' structures presented herein are not limitative and that any other reciprocating structures may be used equivalently without departing from the teachings of this disclosure. To provide a sufficient light lock 61' between the cap 57 and the medical testing device, any type of joint which inserts a structure from one of the cap or the testing device into a reciprocating structure may be used. However, for manufacturing ease, a ridge and groove configuration may be desirable.

Figure 6:
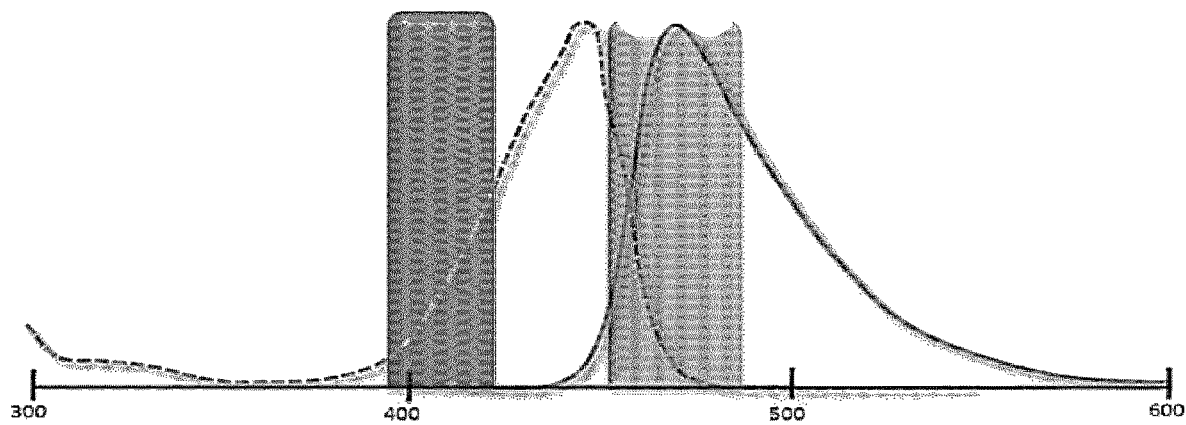
FIG. 6 is a graph of an exemplary fluorescent emission response to a mobile device flash by an aptamer molecular photonic beacon.

FIG. 6 is a graph of an exemplary fluorescent emission response to a mobile device flash by an Aptamer Molecular Photonic Beacon. In this embodiment, the light exciting the AMPB's reporters may be around 450 nm (dotted line) and the fluorescent response produced by the AMPB's reporters may be emitted at a higher wavelength.

Someone skilled in the art will appreciate that specific wavelengths disclosed herein may change with different models of mobile devices, as may the sensitivity of the method and characteristics of the fixture. As a result of such, the Aptamer Molecular Beam specifications (e.g. fluorophore and quencher used, etc.) may also change. However, whether any or all of these changes are made to the aptamer molecular photonic beacon testing device, the underlying principles are the same as taught herein.

Software Application

To operate the aptamer molecular photonic beacon testing device with a mobile device, a software application can be used. As a matter of fact, the software application is used as the test uses control over the flash, the camera, computing power and other modules of the mobile device.

Figure 7:
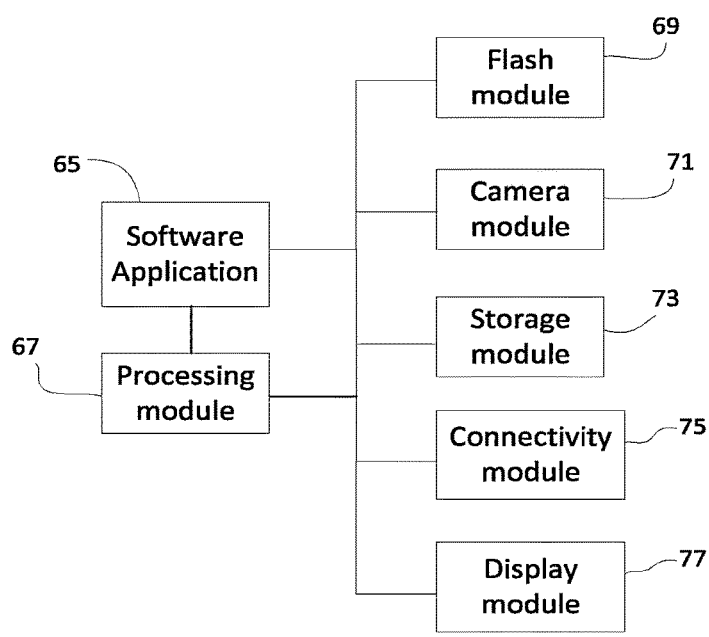
FIG. 7 is a diagram of the modules of an exemplary mobile device running an aptamer molecular photonic beacon test.

Now referring to FIG. 7, which is a diagram of the modules of an exemplary mobile device running an aptamer molecular photonic beacon test. In a mobile device, the software application 65 may have access to numerous modules (herein defined as all the software and hardware components of the mobile device required to control its associated feature). As such, the software application 65 for the aptamer molecular photonic beacon test may access and operate the processing module 67, the flash module 69, the camera module 71, the storage module 73, the connectivity module 75 and the display module 77.

The connectivity module can establish a connection to a server associated with the provider of the test vials. The application 65 can be configured to perform a test only when the user of the application 65 enters a valid code associated with the test vials, such as by acquiring an image of a barcode or by entering a code found on the vial or its packaging. The code can be validated locally by the application 65 using conventional decryption, hash value or checksum verification, or it can be validated by the server. If the code is invalid, the test vial should not be trusted. If ever a batch of vials were to be found to be defective, the server can report to the application 65 that the vial, even with a valid code, is defective and notify the user to seek a replacement using the display module 77.

The software application 65 may thus provide the processing module 67 (which may include the mobile device's processor, transitory and non-transitory memory units, etc.) with instructions which, when they are executed are operable to control the other modules of the mobile device. As such, the flash module 69 may be operated by the software application 65 to trigger at a start of a test and to last for a given timeframe. Once the flash has been operated, the software application 65 may allow the camera module 71 to capture images inside the testing device. The software application 65 may choose the camera lens with the highest quantum efficiency, which may be about 75% at 490 nm. The software application 65 may capture the amount of light emitted by the AMPBs reporters over a given capture time. Although the exposure time can be any capture time lower than the longest lasting emission delay, the applicant has found in certain tests that the best results are produced with an exposure time of about 10 seconds. In this embodiment, a refined photon measurement is then calculated with a program integrated to the software application 65, allowing for an average error reduction and a more precise reading of photons. This program implements a discrete fast Fourier transform (FFT) background subtraction to the raw image previously captured with the mobile using a pre-set or recently taken image as the background reference in which the background subtraction is performed in the Fourier transform frequency domain and the inverse FFT is used to provide the image with the background removed. When the refined photons measurement is above the threshold specified in the application, the pathogen has been detected and this can be displayed or, via the communications capabilities of the mobile, transmitted. If the refined photon measurement is below the threshold, the negative results are displayed or communicated, as required.

The smartphone or other mobile device with the ability to induce a response of the AMPBs fluorophores can be programmed to capture a single event (e.g. one flash), or a series of events. Such events then can form databases where the results can be deduced by algorithms or AI that is built into the mobile device.

The displaying of the results may be done through the display module 77 which the software application 65 may control to display any desired information. As described, the results may be communicated to any other system (local or through a wired or wireless connection) or online database through the mobile device's connectivity module 75. A copy of the data (test result, recorded pictures, name of the user, timestamp, barcode of the testing vial, etc.) may also be locally registered on the mobile device's storage module 73. Additionally, when no wired or wireless connections are available, the data may be stored locally before being uploaded to an online server once a connection has been established.

Mobile devices may have numerous other sensors which may allow for the registration and reporting of useful data. As such, the results can contain personal information (as configured by the user or mandated by an official health organization), such as name, time, date, and GPS coordinates. This may be particularly helpful in conjunction with pandemic tracking applications. The software application 65 may thus provide an API to connect to such other apps.

Someone skilled in the art will appreciate that the mobile device capabilities required to perform the functions listed herein maybe performed by other computing devices with the same capabilities as described herein.

It will be appreciated that a dedicated analyzer apparatus can be used instead of a smartphone-based system. Such a dedicated analyzer apparatus can comprise the necessary hardware and software components to provide the functional system of FIG. 7 while optionally including an enclosure or housing for holding the test vial or probe to exclude ambient light during detection of the fluorescence light. Such a dedicated analyzer device can also be compatible with smartphone-based systems in that it can produce the same blue wavelength found in the smartphone's white light flash source. With a dedicated analyzer apparatus, the camera can be replaced by a more sensitive photon detector, such as a single-photon avalanche diode detector or SPAD detector. SPAD detectors are commercially available.

Aptamer Molecular Photonic Beacon Testing Method

As described herein, the aptamer molecular photonic beacon testing device and the software application running on the mobile device may be used to perform testing against a target pathogen. The Aptamer Molecular photonic beacon may thus be specific to the target pathogen, such that it may attach to it and its reporter may emit a fluorescent response to a light source. The ability to measure the emitted fluorescence by the mobile device's camera(s) provides the means to establish the amount of virus found (viral load) inside a fluid sample from a person and thereafter to establish the strength of the infection (or the lack of infection). A sequence of tests on the same patient over days may further establish the growth and demise of the infection.

Similarly this method of evaluation of the presence of the virus in any method by using the power of a mobile device or similar device can improve the acquired results and eliminate the human factor such as in PCR based tests for virus or other pathogens.

Figure 8:
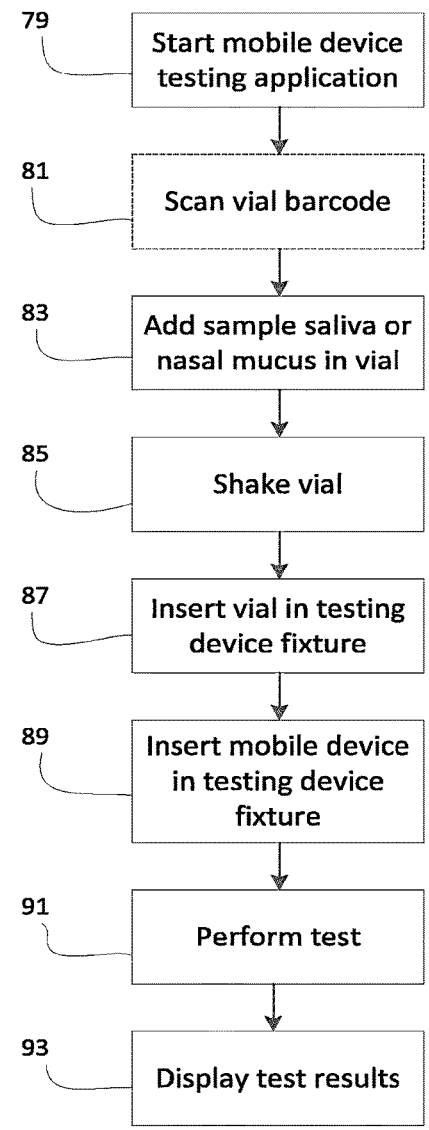
FIG. 8 is a flowchart of an exemplary method of testing for a target pathogen using an aptamer molecular photonic beacon testing device with a mobile device.

Now referring to FIG. 8, which is a flowchart of an exemplary method of testing for a target pathogen using an aptamer molecular photonic beacon testing device with a mobile device. The person performing the test, which may be the test subject or another tester/operator, may start the testing sequence by starting the mobile device's testing application 79. If the test vials are configured with a barcode, the person performing the test may thereafter scan the vial's barcode 81. In some embodiments, this may provide necessary information to the testing software application, such as which pathogen is being tested, the state of the vial (e.g. first-time use, reuse, contaminated batch, etc.) and any other relevant information.

Afterwards, the tested subject may add a sample of fluid, such as saliva or nasal mucus 83 inside the vial containing the AMPBs and a carrier liquid medium. In order to properly mix the sample fluid with the AMPBs, the vial may then be shaken 85 for a predetermined amount of time. Once completed, the tester may insert the vial inside the testing device's vial slot 87. The mobile device may further be inserted in the testing device's fixture 89 and the test may be subsequently performed 91.

Performing the test 91 may include triggering the flash light source for a given period of time. The image capture may thereafter be done either immediately after the flash light source has extinguished (i.e. when using certain fluorophores, they may continue to emit light for a given time even after the excitation input is removed; this may therefore be used with embodiments of the device which does not include a filter for the camera as the only light that may be captured would come from fluorophores) or may be done while the flash light source is still providing light to the test vial. In some embodiments, the testing device may proceed to a number of flash light source and image capture cycles, such as to have multiple data points that may be used in the image post-processing step.

Once the test has been completed and the software application has run its analysis of the captured images, the test results may be displayed 93 on the mobile device. In some embodiments, the test results may be further communicated and/or stored locally or on a remote server.

It will be recognized that this method of detecting virus and other pathogens, forming light emitting molecular photonic beacons formed from aptamers with fluorophores matched to the flash spectrum of the flash light and spectral sensitivity of the cameras, is a new and efficient means of detecting any type of virus, or parts thereof, or surface proteins, that binds to the specifically tailored sequences of the probe that is an aptamer or other biological molecular sequence. While aptamers with fluorophore reporters have been described in prior art research, its uses have generally been limited to detection by spectroscopy or using specialized tools and devices. Being able to test and detect a response from a simple mobile device, as a vast majority of the worldwide population have access to, is a significant improvement.

What is claimed is:

1. A method for detecting a pathogen comprising:
   adding a test subject sample fluid to a replaceable aptamer molecular photonic beacon test vial,
   the test subject sample fluid comprising a solution of aptamer molecular photonic beacons and a carrier liquid medium, wherein the aptamer molecular photonic beacons are selected to bind to a protein, RNA or DNA of a target pathogen and further comprise a reporter molecule and a quencher molecule, the reporter molecule being operable to receive light and emit light after binding to the target pathogen, the binding modifying a configuration of the aptamer molecular photonic beacons from a quenched configuration, where the quencher molecule is in proximity with the reporter molecule, to an emitting configuration where the quencher molecule and the reporter molecule are separated, where molecules of the aptamer molecular photonic beacons have a stem sequence, a loop sequence, a fluorophore reporter as the reporter and the quencher in an unbound state in which the quencher is proximate the fluorophore reporter to prevent fluorescence, wherein the stem sequence selectively binds to the target pathogen to become in a bound state in which the quencher is remote from the fluorophore reporter to allow fluorescence, and an excitation wavelength of the fluorophore reporter is between about 450 nm and 470 nm;
   aligning a camera and a flash light source of a mobile computing device with at least one aperture of a light proof enclosure of a testing device fixture, the flash light source of the mobile computing device being made of Light Emitting Diodes that have a fundamental light emission between 450 to 460 nm;
   inserting the aptamer molecular photonic beacon test vial in a test vial receptacle of the testing device fixture;
   detecting a presence of the target pathogen by:
      operating the flash light of the mobile computing device to illuminate the solution in the vial to excite said reporter molecule;
      acquiring at least one image of emission from the reporter molecule using the camera of the mobile computing device by causing the camera to capture an image of the replaceable aptamer molecular photonic beacon test vial to acquire the at least one image of emission from the reporter molecule; and
      computing an infection status based on any emitted light from said reporter molecule bound to the target pathogen detected from the captured image; and
   communicating the infection status to a user of the mobile computing device.

2. The method as defined in claim 1, wherein the flash light source of the mobile computing device is a blue GaN light-emitting diode emitting with a peak at about 460 nm with a layer of light-emitting phosphor to produce other wavelengths so that the combination of wavelengths appears to be white to the human eye.

3. The method as defined in claim 1, wherein the camera of the mobile computing device is aligned with a filter, which is a bandpass filter with a narrow band around 490 nm and the fluorophore reporter emits light at around 490 nm.

4. The method as defined in claim 1, wherein a mobile device readable non-transitory memory of the mobile computing device stores instructions which, when they are executed are operable to control the mobile computing device including to trigger to operate the flash light source of the mobile computing device at a start of a test and to last for a given timeframe, and to operate the camera to capture images inside the testing device, the mobile computing device capturing the amount of light emitted by the fluorophore reporters over a given capture time and calculating a refined photon measurement with a program integrated to the mobile computing device, the program including instructions which, when they are executed, implement a discrete fast Fourier transform (FFT) background subtraction to a raw image previously captured with the camera using a pre-set or recently taken image as the background reference in which the background subtraction is performed in the Fourier transform frequency domain and the inverse FFT is used to provide the image with the background removed.

5. The method as defined in claim 4, wherein the given capture time is 10 seconds.

6. The method as defined in claim 3, wherein the mobile computing device is adapted to choose the camera lens of plural camera lenses with the highest quantum efficiency at the emission wavelength of the fluorophore reporter.

7. The method as defined in claim 1, further comprising storing at least one of said captured image and said infection status in a storage module of said mobile device, and/or sending at least one of said captured image and said infection status to a remote server.

8. The method as defined in claim 1, further comprising one of receiving a user input code on said mobile computing device and scanning a barcode associated with said vial using said camera of said mobile computing device to determine at least one of the state of said replaceable test vial and a target pathogen being tested, and using said mobile computing device to communicate with a remote server to validate said replaceable test vial based on one of said code and said barcode.

9. The method as defined in claim 1, wherein said at least one image of emission from said reporter molecule using said camera is analyzed to determine a severity of an infection or disease.

\* \* \* \* \*